United States Patent
Schliwa-Bertling et al.

(10) Patent No.: US 9,877,141 B2
(45) Date of Patent: Jan. 23, 2018

(54) MANAGEMENT OF WIRELESS DEVICES IN LIMITED RADIO COVERAGE

(71) Applicant: TELEFONAKTIEBOLAGET LM ERICSSON (PUBL), Stockholm (SE)

(72) Inventors: Paul Schliwa-Bertling, Ljungsbro (SE); Mårten Sundberg, Årsta (SE); John Walter Diachina, Garner, NC (US); Nicklas Johansson, Brokind (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 172 days.

(21) Appl. No.: 15/013,835

(22) Filed: Feb. 2, 2016

(65) Prior Publication Data

US 2016/0157251 A1 Jun. 2, 2016

Related U.S. Application Data

(63) Continuation-in-part of application No. 14/748,026, filed on Jun. 23, 2015.

(60) Provisional application No. 62/016,558, filed on Jun. 24, 2014, provisional application No. 62/107,847, filed on Jan. 26, 2015.

(51) Int. Cl.
| | |
|---|---|
| H04W 4/00 | (2009.01) |
| H04L 1/00 | (2006.01) |
| H04L 1/08 | (2006.01) |
| H04W 88/02 | (2009.01) |
| H04W 88/14 | (2009.01) |
| H04W 68/02 | (2009.01) |

(52) U.S. Cl.
CPC ......... *H04W 4/005* (2013.01); *H04L 1/0013* (2013.01); *H04L 1/08* (2013.01); *H04W 68/02* (2013.01); *H04W 88/02* (2013.01); *H04W 88/14* (2013.01)

(58) Field of Classification Search
CPC ..... H04W 68/02; H04W 88/02; H04W 88/14; H04W 4/005; H04L 1/0013; H04L 1/08
See application file for complete search history.

(56) References Cited

U.S. PATENT DOCUMENTS

| | | |
|---|---|---|
| 8,503,308 B1 | 8/2013 | Oroskar et al. |
| 8,893,009 B2 | 11/2014 | Raleigh et al. |
| 2005/0003822 A1 | 1/2005 | Aholainen et al. |
| 2010/0027467 A1 | 2/2010 | Wu et al. |

(Continued)

FOREIGN PATENT DOCUMENTS

EP 2 161 951 A1 3/2010

OTHER PUBLICATIONS

Ericsson LM, "Extended Coverage for GSM, Realizing extended coverage through Coverage Classes", 3GPP TSG GERAN1 Adhoc#1 on FS_IoT_LC, GPC150065, Sophia Antipolis, France, Feb. 2-5, 2015, the whole document.

(Continued)

*Primary Examiner* — Jenee Holland

(57) ABSTRACT

A mechanism is described herein for enhancing the radio coverage for a wireless device based on an exchange of uplink and downlink radio condition information, referred to as uplink and downlink Radio Coverage Category (RCC) values, between the wireless device and a network (e.g., a Radio Access Network (RAN) node, Core Network (CN) node) for use in data transmission (e.g., control plane related signaling or user plane related payload transmission).

26 Claims, 19 Drawing Sheets

(56) References Cited

U.S. PATENT DOCUMENTS

| | | | |
|---|---|---|---|
| 2010/0091920 A1 | 4/2010 | Alexander et al. | |
| 2010/0323707 A1* | 12/2010 | Huschke | H04H 20/423 455/450 |
| 2011/0021153 A1 | 1/2011 | Safavi | |
| 2011/0176507 A1* | 7/2011 | Yuk | H04L 5/0007 370/329 |
| 2014/0003348 A1 | 1/2014 | Velev et al. | |
| 2014/0064215 A1* | 3/2014 | Wu | H04L 5/0092 370/329 |
| 2014/0086188 A1* | 3/2014 | Hoymann | H04L 5/0053 370/329 |
| 2014/0098761 A1 | 4/2014 | Lee et al. | |
| 2014/0334372 A1* | 11/2014 | Vos | H04W 48/10 370/312 |
| 2015/0195069 A1* | 7/2015 | Yi | H04L 5/0053 370/329 |
| 2015/0373683 A1 | 12/2015 | Schliwa-Bertling et al. | |
| 2015/0382294 A1 | 12/2015 | Schliwa-Bertling et al. | |
| 2016/0007406 A1 | 1/2016 | Yi et al. | |
| 2016/0037540 A1 | 2/2016 | Johansson et al. | |
| 2016/0073395 A1 | 3/2016 | Liberg et al. | |
| 2016/0105926 A1 | 4/2016 | Diachina et al. | |
| 2016/0211986 A1 | 7/2016 | Diachina et al. | |
| 2016/0219553 A1 | 7/2016 | Sundberg et al. | |
| 2016/0219564 A1 | 7/2016 | Bergqvist et al. | |
| 2016/0262130 A1 | 9/2016 | Johansson et al. | |
| 2016/0309449 A1 | 10/2016 | Diachina et al. | |
| 2016/0337417 A1 | 11/2016 | Pudney | |
| 2016/0345293 A1 | 11/2016 | Diachina et al. | |
| 2016/0345380 A1 | 11/2016 | Diachina et al. | |
| 2016/0366669 A1 | 12/2016 | Yum et al. | |
| 2017/0064743 A1 | 3/2017 | Lei et al. | |

OTHER PUBLICATIONS

Ericsson LM, "EC-GSM—Dynamic Coverage Class Update", GPC150077, Sofia Antipolis, France, Feb. 2-5, 2015, the whole document.
Ericsson LM, "EC-GSM, Adjusting the Estimated Coverage Class", 3GPP TSG GERAN FS_IoT_LC Adhoc#2, GPC150223, Sophia Antipolis, Apr. 20-23, 2015, the whole document.
Ericsson LM, "Pseudo CR 45.820—EC-GSM, Adjusting the Estimated Coverage Class", 3GPP TSG GERAN FS_IoT_LC Adhoc#2,GPC150224, Sophia Antipolis, Apr. 20-23, 2015, the whole document.
Ericsson: "GSM Evolution for cellular IoT—PCH Overview". 3GPP TSG GERAN#63. Tdoc GP-140605. Ljubljana, Slovenia. Aug. 25-29, 2014, the whole document.
3rd Generation Partnership Project; Technical Specification Group Core Network and Terminals; Mobile Station—Serving GPRS Support Node (MS-SGSN); Logical Link Control (LLC) layer specification (Release 12), 3GPP TS 44.064 v.12.0.0 (Sep. 2014), the whole document.
3$^{rd}$ Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 12). 3GPP TS 48.018 v12.4.0 (Nov. 2014), the whole document.
Ericsson: "Supporting Extended DRX for uPoD". 3GPP TSG GERAN#64. Tdoc GP-140894. San Francisco, USA. Nov. 17-21, 2014, the whole document.

Ericsson: "Realizing Extended DRX for uPoD". 3GPP TSG GERAN#64. Tdoc GP-140895. San Francisco, USA. Nov. 17-21, 2014, the whole document.
Alcatel-Lucent et al.: "Configurable repetition level for PBCH", R1-132055, 3GPP TSG- RAN WG1 Meeting #73, Fukuoka, Japan, May 20-24, 2013, paragraph [0002]; figure 1.
Ericsson: "System information for enhanced coverage MTC UE", 3GPP Draft; R1-134647, 3GPP TSG RAN WG1 Meeting #74bis, Guangzhou, China, Oct. 7-11, 2013, paragraph [02.1]-paragraph [02.2].
3 Generation Partnership Project; Technical Specification Group Radio Access Network; Evolved Universal Terrestrial Radio Access (E-UTRA); LTE coverage enhancements (Release 11). 3GPP TR 36.824 v11.0.0 (Jun. 2012), the whole document.
Vodafone Group PLC: "New Study Item on Cellular System Support for Ultra Low Complexity and Low Throughput Internet of Things". 3GPP TSG-GERAN Meeting #62. GP-140421 (rev. of GP-140418 rev. of GP-140411). Valencia, Spain. May 26-30, 2014.
Ericsson: "Accelerated System Access Procedure", 3GPP TSG GERAN #62, Tdoc GP-140365, Valencia, Spain, May 26-30, 2014, the whole document.
Vodafone Group PLC.: "Revision of TR on Cellular loT to include agreements at GERAN#63 and GERAN#64 (V030)". 3GPP TSG GERAN1 adhoc#1& GERAN#2 Adhoc#1 on FS_IoT_LC. GPC150009. Sophia-Antipolis, France. Feb. 2-5, 2015.
Ericsson: "EC-GSM, Support of Normal Bursts in Large Cells". 3GPP TSG GERAN #65. Tdoc GP-150173. Mar. 9-13, 2015. Shanghai, China.
"Draft Report of TSG GERAN WG1 during TSG GERAN #61, version 0.0.1". Technical Specification Group Geran WG1 Radio Aspects. Meeting #61. GP-140241. Sophia Antipolis, Feb. 25-27, 2014.
Sony: "Low-cost capability Issues". 3GPP TSG-RAN WG2 Meeting #85. R2-140365. Prague, Czech Republic, Feb. 10-14, 2014.
Sierra Wireless: "EC-GSM—Device Design Aspects". 3GPP TSG GERAN # 65. Tdoc GP-150060. Shanghai, China. Mar. 9-13, 2015.
Sigfox Wireless: "C-UNB technology for Cellular IoT—Performance evaluation". 3GPP TSG GERAN #65 meeting. GP150059. Shanghai, PR of China. Mar. 9-12, 2015.
Ericsson LM: "GSM Evolution for cellular IoT—On using blind repetitions". 3GPP TSG GERAN#64. GP-140882. San Francisco, USA. Nov. 17-21, 2014.
Ericsson: "EC-GSM, FCCH overview". 3GPP TSG GERAN Ad Hoc#1 on FS_IoT_LC. Tdoc GPC150066. Feb. 2-5, 2015, Sophia Antipolis, France.
Ericsson LM: "EC-GSM—EC-SCH design, performance and mapping". 3gPP TSG GERAN1 Adhoc#1 on FS_IoT_LC. Tdoc GPC150064. Feb. 2-5, 2015. Sophia Antipolis, France.
Ericsson: "EC-GSM—Random Access Procedure". 3GPP TSG GERAN Ad Hoc#1 on FS_IoT_LC. Tdoc GPC150074. Feb. 2-5, 2015. Sofia Antipolis, France.
Ericson: "GSM Evolution for cellular IoT—BCCH Overview". 3GPP TSG GERAN#63. Tdoc GP-140603. Aug. 25-29, 2014. Ljubljana, Slovenia.
Ericsson: "EC-GSM—Mapping of logical channels onto physical channels". 3GPP TSG GERAN Ad Hoc#1 on FS_IoT_LC. Tdoc GPC150055. Feb. 2-5, 2015. Sofia Antipolis, France.
3$^{rd}$ Generation Partnership Project; Technical Specification Group GSM/EDGE Radio Access Network; Cellular System Support for Ultra Low Complexity and Low Throughput Internet of Things (Release 13). 3GPP TR 45.820 v1.3.0 (Jun. 2015).

\* cited by examiner

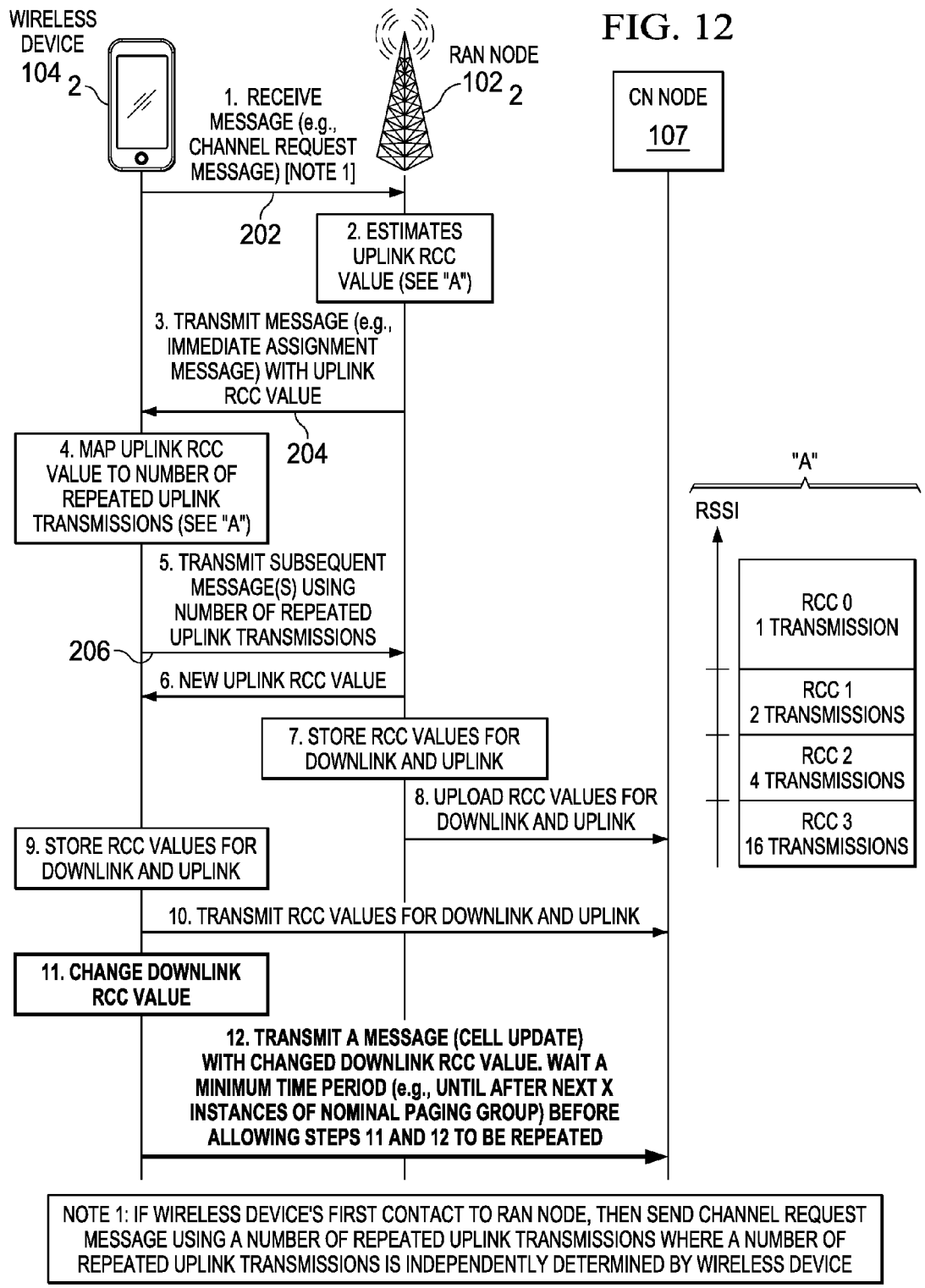

MANAGEMENT OF WIRELESS DEVICES IN LIMITED RADIO COVERAGE

CLAIM OF PRIORITY

This application is a continuation-in-part of U.S. application Ser. No. 14/748,026, filed Jun. 23, 2015, now pending, which claims the benefit of priority to U.S. Provisional Application No. 62/016,558, filed on Jun. 24, 2014, and to U.S. Provisional Application No. 62/107,847, filed on Jan. 26, 2015, the entire contents of each of these applications are hereby incorporated by reference for all purposes.

TECHNICAL FIELD

The present disclosure relates to radio transmission and reception of a network and a wireless device and, more particularly, to techniques for enhancing a radio coverage based on an exchange of radio condition information between a network and a wireless device for repeating data transmissions on a radio interface between the network and the wireless device.

BACKGROUND

The following abbreviations and terms are herewith defined, at least some of which are referred to within the following description of the present disclosure.
3GPP 3rd-Generation Partnership Project
AB Access Burst
AGCH Access Grant Channel
ASIC Application Specific Integrated Circuit
BCCH Broadcast Control Channel
BLER Block Error Ratio
BSC Base Station Controller
BSS Base Station Subsystem
CC Coverage Class
CCCH Common Control Channel
CIoT Cellular Internet of Things
CN Core Network
DL Downlink
DSP Digital Signal Processor
eDRX Extended Discontinuous Receive
EC-GSM Extended Coverage-Global System for Mobile Communications
EDGE Enhanced Data rates for GSM Evolution
EGPRS Enhanced General Packet Radio Service
eNB evolved Node B
E-UTRA Evolved Universal Terrestrial Radio Access
FCCH Frequency Correction Channel
GSM Global System for Mobile Communications
GERAN GSM/EDGE Radio Access Network
HARQ Hybrid Automatic Repeat Request
IE Information Element
IMSI International Mobile Subscriber Identity
IoT Internet of Things
LLC Logical Link Control
MCL Maximum Coupling Loss
MME Mobile Management Entity
MTC Machine Type Communications
NAS Non-Access Stratum
NB Normal Burst
LTE Long-Term Evolution
PACCH Packet Associated Control Channel
PDN Packet Data Network
PDTCH Packet Data Traffic Channels
PDU Protocol Data Unit
RACH Random Access Channel
RAN Radio Access Network
RAT Radio Access Technology
RAU Routing Area Update
RCC Radio Coverage Category
RLC Radio Link Control
RNC Radio Network Controller
RRC Radio Resource Control
SCH Synchronization Channel
SGSN Serving GPRS Support Node
SI System Information
TA Timing Advance
TLLI Temporary Logical Link Identifier
TS Timeslot
UE User Equipment
UL Uplink
UMTS Universal Mobile Telecommunications System
WCDMA Wideband Code Division Multiple Access
WiMAX Worldwide Interoperability for Microwave Access The anticipated ubiquitous deployment of wireless devices used for what is known as Machine-Type-Communication (MTC) will result in wireless devices being placed outside the typical radio coverage of the existing radio networks, e.g., in basements and similar locations. One way to improve the radio coverage is by expanding the radio access network infrastructure, such as by adding additional Radio Base Station (RBS) equipment. This, however, may very quickly result in an unreasonable investment effort and may not be acceptable to operators.

An alternative approach to adding additional equipment is to keep the existing radio access network infrastructure unchanged but instead improve the radio coverage through novel radio transmission and reception techniques as well as new Radio Resource Management algorithms. The latter approach is currently being discussed in the wireless industry and is a subject for a standardization effort, for example, in the 3rd-Generation Partnership Project (3GPP) as described in the 3GPP TR 36.824 V11.0.0 Technical Report, entitled "Evolved Universal Terrestrial Radio Access (E-UTRA); LTE coverage enhancements" and the 3GPP TSG-GERAN Meeting #62 Work Item Description GP-140421, entitled "New Study Item on Cellular System Support for Ultra Low Complexity and Low Throughput Internet of Things." The contents of these two documents are hereby incorporated herein by reference for all purposes.

While there are many techniques that can be used to enhance the radio coverage, one technique is to enhance the radio coverage through the use of repeated transmissions. The repeated transmissions technique is currently being considered in the context of the related standardization work in 3GPP TSG RAN, as described in the above-referenced 3GPP TR 36.824 V11.0.0 Technical Report, entitled "Evolved Universal Terrestrial Radio Access (E-UTRA); LTE coverage enhancements" as well as in 3GPP TSG GERAN as described in the 3GPP TR 45.820 V1.3.0 Technical Report, entitled "Cellular System Support for Ultra Low Complexity and Low Throughput Internet of Things".

A problem seen with the existing solutions associated with the repeated transmissions technique described in the above-referenced Technical Reports is that neither the wireless device nor the network, in this case, the Radio Access Network (RAN) node responsible for the repeated transmissions (e.g., the evolved Node B (eNB) in Long Term Evolution (LTE), the Radio Network Controller (RNC) in 3G, or the Base Station Controller (BSC) in 2G), is aware of the Radio Coverage Category (RCC) applicable when starting up a new uplink or downlink data transmission for a wireless device. This may, in a large degree, result in either too few or too many repeated transmissions during the initial phase of the data transmissions with the wireless device (e.g., a period of time during which wireless device specific RCC information is not known by the RAN node). For example, too few repeated transmissions may be initially applied to the transmissions, resulting in a failed data transmission, due to an erroneous initial estimate in the number of repeated transmissions needed. This may then be followed by another set of repeated transmissions based on a better understanding of the needed number of repeated transmissions (e.g., derived from the failed data transmission) but still resulting in inefficient usage of the scarce radio resources. Alternatively, too many repeated transmissions may be initially applied to the transmissions, resulting in the inefficient usage of the scarce radio resources, adding interference to the network, and consuming too much energy, etcetera.

Given that a large portion of the applications associated with MTC (including Internet of Things (IoT)) will be predominantly used for transfer of small amounts of a data (e.g., electricity meter data, temperature sensor data, etc.), an improved mechanism for accurately determining the number of needed repeated transmissions to and/or from a wireless device would be a very valuable if not a critical requirement to satisfy during the initial phase of downlink or uplink data transmission between the RAN node and the wireless device. This need and other needs are addressed by the present disclosure.

SUMMARY

A wireless device and various methods for addressing at least the aforementioned need are described in the independent claims. Advantageous embodiments of the wireless device and the various methods are further described in the dependent claims.

In one aspect, the present disclosure provides a wireless device configured to communicate with a RAN node and a CN node. The wireless device comprises a processor and a memory that stores processor-executable instructions, wherein the processor interfaces with the memory to execute the processor-executable instructions, whereby the wireless device is operable to perform a receive operation, an estimate operation, a map operation, a first transmit operation, a determine operation, an increment operation, and a second transmit operation. In the receive operation, the control channels are received from the RAN node. In the estimate operation, a downlink radio condition is estimated based on a signal quality of the received control channels. In the map operation, the estimated downlink radio condition is mapped to one of a plurality of downlink Radio Coverage Category (RCC) values. In the first transmit operation, one or more access burst (AB) based first messages (e.g., a plurality of Channel Request messages sent on the RACH) are transmitted to the RAN node per an uplink RCC value, wherein each of the one or more AB based first messages includes the one downlink RCC value. In the determine operation, a determination is made that a first AB based system access failed after transmitting the one or more AB based first messages. Upon the determination that the first AB based system access failed, the increment operation and the second transmit operation are performed. In the increment operation, the one downlink RCC value, the uplink RCC value, or both the one downlink RCC value and the uplink RCC value are incremented. In the second transmit operation, one or more access burst (AB) based second messages are transmitted to the RAN node per the uplink RCC value, if not incremented, or the incremented uplink RCC value, if incremented, wherein each of the one or more AB based second messages includes the one downlink RCC value, if not incremented, or the incremented one downlink RCC value, if incremented. The wireless device configured to operate in this manner will address the need in the state-of-the-art by effectively using scarce radio resources, reducing interference to the network, and reducing the consumption of the wireless device's battery power, etcetera, during the initial phase of data transmission.

In one aspect, the present disclosure provides a method in a wireless device configured to communicate with a RAN node and a CN node. The method comprises a receiving step, an estimating step, a mapping step, a first transmitting step, a determining step, an incrementing step, and a second transmitting step. In the receiving step, the control channels are received from the RAN node. In the estimating step, a downlink radio condition is estimated based on a signal quality of the received control channels. In the mapping step, the estimated downlink radio condition is mapped to one of a plurality of downlink Radio Coverage Category (RCC) values. In the first transmitting step, one or more access burst (AB) based first messages (e.g., a plurality of Channel Request messages sent on the RACH) are transmitted to the RAN node per an uplink RCC value, wherein each of the one or more AB based first messages includes the one downlink RCC value. In the determining step, a determination is made that a first AB based system access failed after transmitting the one or more AB based first messages. Upon the determination that the first AB based system access failed, the incrementing step and the second transmitting step are performed. In the incrementing step, the one downlink RCC value, the uplink RCC value, or both the one downlink RCC value and the uplink RCC value are incremented. In the second transmitting step, one or more access burst (AB) based second messages are transmitted to the RAN node per the uplink RCC value, if not incremented, or the incremented uplink RCC value, if incremented, wherein each of the one or more AB based second messages includes the one downlink RCC value, if not incremented, or the incremented one downlink RCC value, if incremented. The wireless device configured to implement this method will address the need in the state-of-the-art by effectively using scarce radio resources, reducing interference to the network, and reducing the consumption of the wireless device's battery power, etcetera, during the initial phase of data transmission.

In yet another aspect, the present disclosure provides a wireless device configured to communicate with a RAN node. The wireless device comprises a processor and a memory that stores processor-executable instructions, wherein the processor interfaces with the memory to execute the processor-executable instructions, whereby the wireless device is operable to perform a receive operation, an estimate operation, a map operation, a determine operation, a first transmit operation, and a second transmit operation. In the receive operation, the control channels are received from the RAN node. In the estimate operation, a downlink radio condition is estimated based on a signal quality of the received control channels. In the map operation, the estimated downlink radio condition is mapped to one of a plurality of downlink Radio Coverage Category (RCC) values. In the determine operation, it is determined whether the received control channels indicate a first cell size or a second cell size, where the first cell size is smaller than the second cell size. In the first transmit operation, based on the determination that the received control channels indicate the first cell size, one or more normal burst (NB) based first messages are transmitted to the RAN node, wherein each of the one or more NB based first messages includes the one downlink RCC value. In the second transmit operation, based on the determination that the received control channels indicate the second cell size, one or more access burst (AB) based first messages are transmitted to the RAN node, wherein each of the one or more AB based first messages includes the one downlink RCC value. The wireless device configured to operate in this manner will address the need in the state-of-the-art by effectively using scarce radio resources, reducing interference to the network, and reducing the consumption of the wireless device's battery power, etcetera, during the initial phase of data transmission.

In yet another aspect, the present disclosure provides a method in a wireless device configured to communicate with a RAN node. The method comprises a receiving step, an estimating step, a mapping step, a determining step, a first transmitting step, and a second transmitting step. In the receiving step, the control channels are received from the RAN node. In the estimating step, a downlink radio condition is estimated based on a signal quality of the received control channels. In the mapping step, the estimated downlink radio condition is mapped to one of a plurality of downlink Radio Coverage Category (RCC) values. In the determine step, it is determined whether the received control channels indicate a first cell size or a second cell size, where the first cell size is smaller than the second cell size. In the first transmitting step, based on the determination that the received control channels indicate the first cell size, one or more normal burst (NB) based first messages are transmitted to the RAN node, wherein each of the one or more NB based first messages includes the one downlink RCC value. In the second transmitting step, based on the determination that the received control channels indicate the second cell size, one or more access burst (AB) based first messages are transmitted to the RAN node, wherein each of the one or more AB based first messages includes the one downlink RCC value. The wireless device configured to implement this method will address the need in the state-of-the-art by effectively using scarce radio resources, reducing interference to the network, and reducing the consumption of the wireless device's battery power, etcetera, during the initial phase of data transmission.

In still yet another aspect, the present disclosure provides a wireless device configured to communicate with a RAN node. The wireless device comprises a processor and a memory that stores processor-executable instructions, wherein the processor interfaces with the memory to execute the processor-executable instructions, whereby the wireless device is operable to perform a receive operation, a determine operation, a map operation, and a transmit operation. In the receive operation, a synchronization channel (SCH) is received from the RAN node. In the determine operation, a number of blind transmissions needed to decode the SCH is determined. In the map operation, the determined number of blind transmissions needed to decode the SCH is mapped to an uplink RCC value and a downlink RCC value. In the transmit operation, a first message having a number of repeated transmissions based on the uplink RCC value is transmitted to the RAN node, wherein the first message also includes the downlink RCC value. The wireless device configured to operate in this manner will address the need in the state-of-the-art by effectively using scarce radio resources, reducing interference to the network, and reducing the consumption of the wireless device's battery power, etcetera, during the initial phase of data transmission.

In still yet another aspect, the present disclosure provides a method in a wireless device configured to communicate with a RAN node. The method comprises a receiving step, a determining step, a mapping step, and a transmitting step. In the receiving step, a synchronization channel (SCH) is received from the RAN node. In the determining step, a number of blind transmissions needed to decode the SCH is determined. In the mapping step, the determined number of blind transmissions needed to decode the SCH is mapped to an uplink RCC value and a downlink RCC value. In the transmitting step, a first message having a number of repeated transmissions based on the uplink RCC value is transmitted to the RAN node, wherein the first message also includes the downlink RCC value. The wireless device configured to implement this method will address the need in the state-of-the-art by effectively using scarce radio resources, reducing interference to the network, and reducing the consumption of the wireless device's battery power, etcetera, during the initial phase of data transmission.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIG. 12 is a signal flow diagram illustrating additional steps in the RCC value determination process that occur during the wireless device originated transfer as shown in FIG. 4 in accordance with another embodiment of the present disclosure;

DETAILED DESCRIPTION

Figure 1:
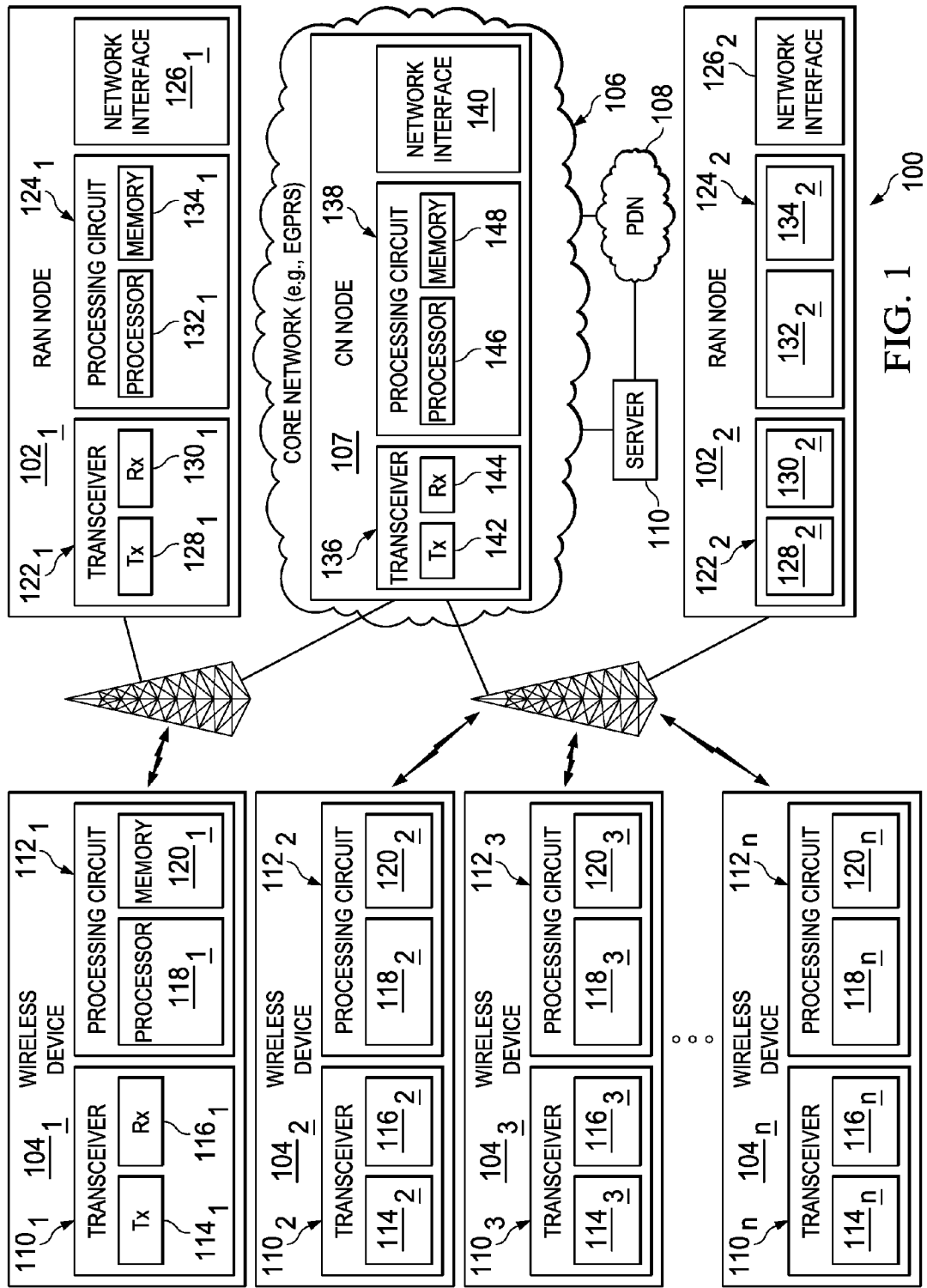
FIG. 1 is a diagram of an exemplary wireless communication network in accordance with an embodiment of the present disclosure.

To describe the technical features of the present disclosure, a discussion is provided first to describe an exemplary wireless communication network which includes multiple wireless devices, multiple RAN nodes, and a CN node each of which are configured in accordance with the present disclosure (see FIG. 1). Then, a discussion is provided to explain the basic techniques and use cases implemented by the wireless device, the RAN node and the CN node in accordance with the present disclosure (see FIGS. 2-5). Thereafter, a discussion is provided to explain in more detail the various techniques implemented by each of the wireless device, the RAN node and the CN node in accordance with the present disclosure (see FIGS. 6-11). Then, a discussion is provided to explain how the network can be updated with coverage class information by the wireless device in accordance with another embodiment of the present disclosure (see FIGS. 12-14). Thereafter, a discussion is provided to explain how the wireless device can estimate its coverage class and how the wireless device can perform AB/NB based system accesses with the RAN node in accordance with another embodiment of the present disclosure (see FIGS. 15A-15B and FIGS. 16A-1B). Finally, a discussion is provided to explain how the wireless device can estimate its UL and DL coverage classes in accordance with still yet another embodiment of the present disclosure (see FIGS. 17-21).

Exemplary Wireless Communication Network 100

Referring to FIG. 1, there is illustrated an exemplary wireless communication network 100 in accordance with the present disclosure. The wireless communication network 100 includes multiple RAN nodes $102_1$ and $102_2$ (only two shown) and a core network 106 (e.g., CN node 107) which interface with multiple wireless devices $104_1$, $104_2$, $104_3$ ... $104_n$. The wireless communication network 100 also includes many well-known components, but for clarity, only the components needed to describe the features of the present disclosure are described herein. Further, the wireless communication network 100 is described herein as being a GSM/EGPRS wireless communication network 100 which is also known as an EDGE wireless communication network 100. However, those skilled in the art will readily appreciate that the techniques of the present disclosure which are applied to the GSM/EGPRS wireless communication network 100 are generally applicable to other types of wireless communication systems, including, for example, WCDMA, LTE, and WiMAX systems.

The wireless communication network 100 includes the RAN nodes $102_1$ and $102_2$ (only two shown) which provide network access to the wireless devices $104_1$, $104_2$, $104_3$ ... $104_n$. In this example, the RAN node $102_1$ is providing network access to wireless device $104_1$ while the RAN node $102_2$ is providing network access to wireless devices $104_2$, $104_3$ ... $104_n$. The RAN nodes $102_1$ and $102_2$ are connected to the core network 106 (e.g., EGPRS core network 106) and, in particular, to the CN node 107. The core network 106 is connected to an external packet data network (PDN) 108, such as the Internet, and a server 110 (only one shown). The wireless devices $104_1$, $104_2$, $104_3$ ... $104_n$ may communicate with one or more servers 110 (only one shown) connected to the core network 106 and/or the PDN 108.

The wireless devices $104_1$, $104_2$, $104_3$ ... $104_n$ may refer generally to an end terminal (user) that attaches to the wireless communication network 100, and may refer to either a MTC device or a non-MTC device. Further, the term "wireless device" is generally intended to be synonymous with the term "User Equipment," or UE, as that term is used by the 3rd-Generation Partnership Project (3GPP), and includes standalone wireless devices, such as terminals, cell phones, smart phones, tablets, and wireless-equipped personal digital assistants, as well as wireless cards or modules that are designed for attachment to or insertion into another electronic device, such as a personal computer, electrical meter, etc.

Likewise, the RAN nodes $102_1$ and $102_2$ may refer in generally to a base station in the wireless communication network 100, and may refer to RAN nodes $102_1$ and $102_2$ that are controlled by a physically distinct radio network controller as well as to more autonomous access points, such as the so-called evolved Node Bs (eNodeBs) in Long-Term Evolution (LTE) networks.

Each wireless device $104_1$, $104_2$, $104_3$ ... $104_n$ may include a transceiver circuit $110_1$, $110_2$, $110_3$ ... $110_n$ for communicating with the RAN nodes $102_1$ and $102_2$, and a processing circuit $112_1$, $112_2$, $112_3$ ... $112_n$ for processing signals transmitted from and received by the transceiver circuit $110_1$, $110_2$, $110_3$ ... $110_n$ and for controlling the operation of the corresponding wireless device $104_1$, $104_2$, $104_3$ ... $104_n$. The transceiver circuit $110_1$, $110_2$, $110_3$ ... $110_n$ may include a transmitter $114_1$, $114_2$, $114_3$ ... $114_n$ and a receiver $116_1$, $116_2$, $116_3$ ... $116_n$, which may operate according to any standard, e.g., the GSM/EDGE standard. The processing circuit $112_1$, $112_2$, $112_3$ ... $112_n$ may include a processor $118_1$, $118_2$, $118_3$ ... $118_n$ and a memory $120_1$, $120_2$, $120_3$ ... $120_n$ for storing program code for controlling the operation of the corresponding wireless device $104_1$, $104_2$, $104_3$ ... $104_n$. The program code may include code for performing the procedures as described hereinafter with respect to FIGS. 6 and 13.

Each RAN node $102_1$ and $102_2$ may include a transceiver circuit $122_1$ and $122_2$ for communicating with wireless devices $104_1$, $104_2$, $104_3$ ... $104_n$, a processing circuit $124_1$ and $124_2$ for processing signals transmitted from and received by the transceiver circuit $122_1$ and $122_2$ and for controlling the operation of the corresponding wireless access node $102_1$ and $102_2$, and a network interface $126_1$ and $126_2$ for communicating with the core network 106. The transceiver circuit $122_1$ and $122_2$ may include a transmitter $128_1$ and $128_2$ and a receiver $130_1$ and $130_2$, which may operate according to any standard, e.g., the GSM/EDGE standard. The processing circuit $124_1$ and $124_2$ may include a processor $132_1$ and $132_2$ and a memory $134_1$ and $134_2$ for storing program code for controlling the operation of the corresponding wireless access node $102_1$ and $102_2$. The program code may include code for performing the procedures as described hereinafter with respect to FIGS. 8A-8B.

The CN node 107 (e.g., SGSN 107, MME 107) may include a transceiver circuit 136 for communicating with the RAN nodes $102_1$ and $102_2$, a processing circuit 138 for processing signals transmitted from and received by the transceiver circuit 136 and for controlling the operation of the RAN nodes $102_1$ and $102_2$, and a network interface 140 for communicating with the RAN nodes $102_1$ and $102_2$. The transceiver circuit 136 may include a transmitter 142 and a receiver 144, which may operate according to any standard, e.g., the GSM/EDGE standard. The processing circuit 138 may include a processor 146 and a memory 148 for storing program code for controlling the operation of the CN node 107. The program code may include code for performing the procedures as described hereinafter with respect to FIGS. 10 and 14.

Basic Techniques and Exemplary Use Cases of the Present Disclosure

The present disclosure provides a new mechanism for enhancing the radio coverage based on the exchange of uplink and downlink radio condition information, referred to as Radio Coverage Category (RCC) values, between the wireless device $104_2$ (for example) and the network 100 (e.g., the RAN node $102_2$ and/or the CN node 107) for use in data transmission (e.g., control plane related signaling or user plane related payload transmission). It is to be noted that the other wireless devices $104_1$, $104_3$ ... $104_n$ and RAN node $102_1$ can also implement the new mechanism of the present disclosure. The disclosed techniques are based on an exchange of estimated RCC values between the network 100 and the wireless device $104_2$ that are used to apply a number (e.g., a pre-defined number) of repeated transmissions on the radio interface. The RCC values may be estimated for the downlink (e.g., from the wireless device $104_2$ perspective) and for the uplink (e.g., from the network 100 perspective). The RCC values may be stored in the relevant network nodes such as the RAN node $102_2$ and the CN node 107 and in the wireless device $104_2$ for use in determining the appropriate number of repeated transmissions for subsequent data transmissions, for example, at paging occasions.

The disclosed techniques can implement one or more of the following principles:

The uplink and downlink radio conditions between the RAN node $102_2$ and a given wireless device $104_2$ may be categorized, organized, or divided into a range of RCC values.

A given RCC value is mapped into a number of repeated transmissions. The mapping of each RCC value to a specific number of repeated transmissions may be standardized and known to the network 100 (e.g., the RAN node $102_2$ and/or the CN node 107) and the wireless device $104_2$. Hence, a given RCC value may implicitly or explicitly indicate the number of repeated transmissions and may therefore be known to the involved entities $102_2$, 107, and $104_2$ in a deterministic manner. Alternatively, the mapping may be adjustable and signaled (e.g., in the system information) to the involved entities $102_2$, 107, and $104_2$.

The wireless device $104_2$ provides an estimate of its downlink RCC value (with relation to its serving RAN node $102_2$/cell) to the network 100 in the applicable procedures and/or messages.

The RAN node $102_2$ provides an estimate of its uplink RCC value in relation to a specific wireless device $104_2$ to that wireless device $104_2$ in the applicable procedures and/or messages.

The network 100 may store the information about the uplink and downlink RCC values in the nodes such as the RAN node $102_2$ and the CN node 107 that would re-use this information in subsequent radio transmissions.

The wireless device $104_2$ may store the information about the uplink and downlink RCC values and re-use this information in subsequent radio transmissions.

The RAN node $102_2$ may upload wireless device specific RCC values for the uplink and downlink associated with a particular wireless device $104_2$ to the relevant CN node 107 (e.g., SGSN 107, MME 107). Alternatively, wireless device specific RCC information may be conveyed by the wireless device $104_2$ to the CN node 107, for example, during Non-Access Stratum (NAS) signaling.

The RAN node $102_2$ applies a number of downlink repeated transmissions over the radio interface based on the available wireless device specific downlink RCC value. The RCC value used for determining the number of repeated transmissions on the downlink may be based on the last received RCC value from the wireless device $104_2$, network 100 (e.g. RAN node $102_2$) estimates of the downlink RCC value (e.g., based on uplink radio quality), or a running average of the received downlink RCC values and/or the network 100 (e.g. RAN node $102_2$) estimated downlink RCC values.

The wireless device $104_2$ applies a number of uplink repeated transmissions based on the available uplink RCC value received from the RAN node $102_2$. The RCC value used for determining the number of repeated transmissions on the uplink may be based on the latest estimated uplink RCC value received from the network 100 (e.g., the RAN node 102₂), the wireless device 104₂ estimates of the uplink RCC value (e.g., based on downlink radio quality), or a running average of received uplink RCC values and/or the wireless device 104₂ estimated uplink RCC values.

For the case when the wireless device 104₂ makes its first contact with the RAN node 102₂ after the wireless device's initial deployment and power on in the field or when the wireless device 104₂ wakes up to perform a system access procedure following a period of sleep, the number of repeated retransmissions the wireless device 104₂ uses when performing a random access procedure (e.g., sending a first message on the Random Access Channel (RACH), such as a Channel Request message on the RACH) may be based on (1) the wireless device's own independent assessment of an appropriate uplink RCC value, or (2) the wireless device's preconfigured information of an appropriate uplink RCC value.

The network 100 (e.g., the RAN node 102₂) applies a number of repetitions based on a stored RCC of the wireless device 104₂. This can, for example, apply when paging the wireless device 104₂ or responding to a first message on the Random Access Channel (RACH), such as a Channel Request message on the RACH.

The RAN node 102₂ and the wireless device 104₂ can make use of the knowledge about the wireless device's type of usage, for example, being a stationary device, that can be preconfigured in the wireless device 104₂ and in e.g., subscription data in the network 100 when deciding whether or not to apply a number of repetitions according to the stored RCC.

Figure 2:
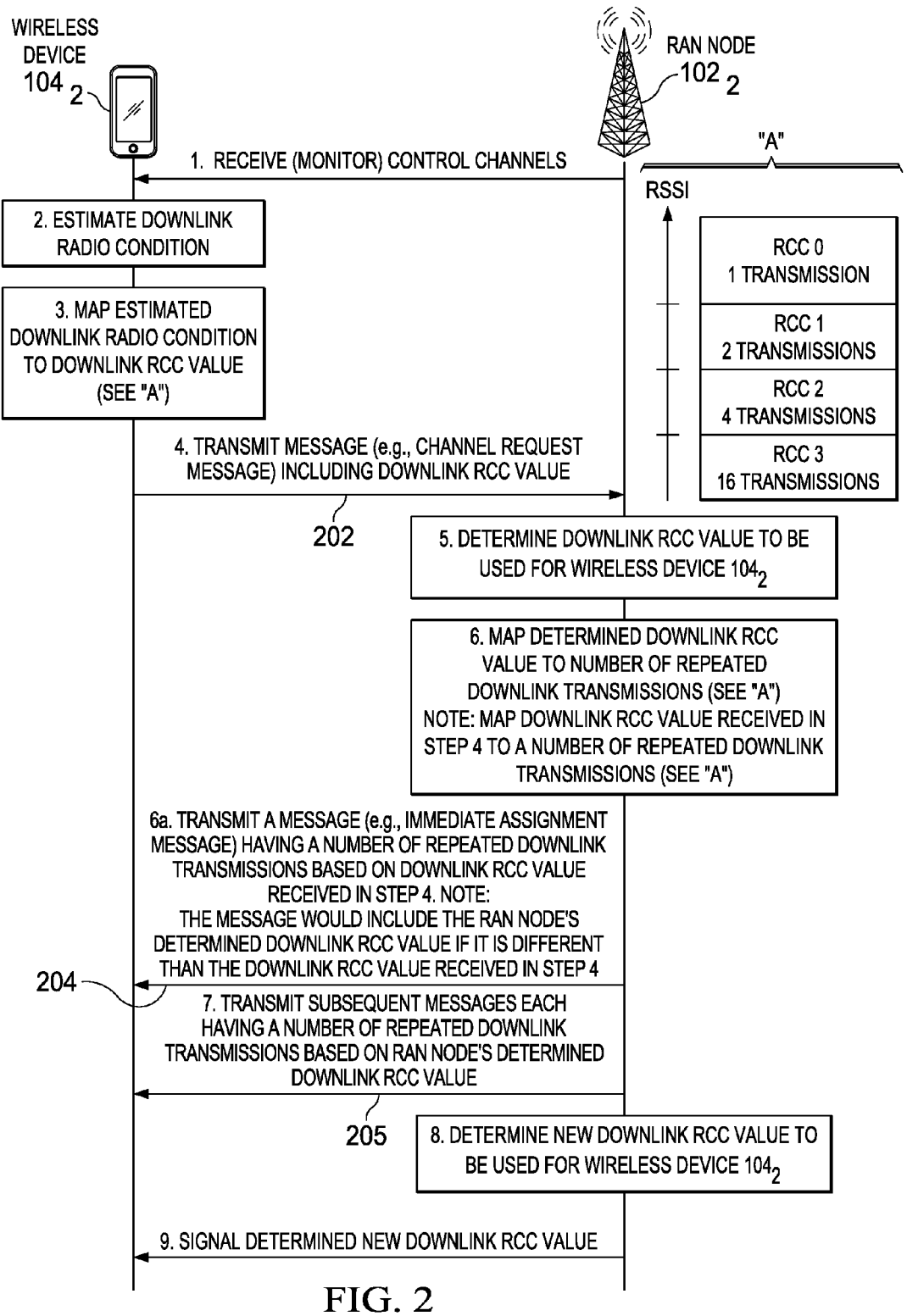
FIG. 2 is a signal flow diagram illustrating a RCC value determination process that occurs during a wireless device originated transfer in accordance with an embodiment of the present disclosure.

Referring to FIG. 2, there is a signal flow diagram illustrating a downlink RCC value determination process that occurs during a wireless device originated transfer in accordance with an embodiment of the present disclosure. Prior to accessing the RAN node 102₂, the wireless device 104₂ receives (e.g., monitors) some Radio Access Technology (RAT) specific set of control channels in order to, for example, obtain the synchronization with the RAN node 102₂ (see FIG. 2's step 1). In the case of Global System for Mobile (GSM), prior to accessing the GSM/EDGE Radio Access Network (GERAN), the wireless device 104₂ will monitor the Synchronization Channel (SCH) and Frequency Correction Channel (FCCH). After the decoding of the SCH, the wireless device 104₂ may also decode the System Information (SI) transmitted on the Broadcast Control Channel (BCCH). The SCH, FCCH, and BCCH in GSM are constantly transmitting on full power.

The wireless device 104₂ utilizes the received control channels to estimate its experienced downlink radio condition based on, for example, a Received Signal Strength Indicator (RSSI), a received estimated quality (e.g., the decoded quality of the SCH and System Information), or any other metric that estimates the wireless device's downlink radio condition (see FIG. 2's step 2).

The wireless device 104₂ maps the estimated downlink radio condition to one of multiple downlink RCC values (see FIG. 2's step 3 and graph "A"). In this example, an RSSI-based mapping is illustrated where the estimated RSSI value is mapped to one of four different downlink RCC values. It is to be noted that the number of downlink RCC values and the number of transmissions for each of the downlink RCC values illustrated in FIG. 2 (i.e., 1 transmission for RCC 0, 2 transmissions for RCC 1, 4 transmissions for RCC 2, and 16 transmissions for RCC 3) are provided as examples. In other cases, there may be fewer or more downlink RCC values and/or different numbers of transmissions may be associated with the downlink RCC values.

The wireless device 104₂ transmits a message 202 which includes the downlink RCC value to the RAN node 102₂ (see FIG. 2's step 4). More specifically, when accessing the RAN node 102₂ for some wireless device originated data transmission, the wireless device 104₂ provides the downlink specific RCC value in an appropriate RRC message 202 (e.g., the Channel Request message 202 in GERAN, the RRCConnectionRequest 202 in LTE or UMTS) or some message during a radio capability acquisition procedure. A means by which the wireless device 104₂ can communicate a downlink specific RCC value to the RAN node 102₂ (e.g., BSS 102₂) is described in U.S. Patent Application No. 61/968,621, filed on Mar. 21, 2014, entitled "Accelerated System Access Procedure (ASAP)". The contents of this document are hereby incorporated by reference herein.

The RAN node 102₂ determines a downlink RCC value to be used for the wireless device 104₂ (see FIG. 2's step 5). The RAN node 102₂ can determine the downlink RCC value to be used for the wireless device 104₂ based on: (1) the received first downlink RCC value (e.g., the downlink RCC value of FIG. 2's step 4); (2) an estimated downlink RCC value (e.g., based on uplink radio conditions); or (3) a running average of previously received first downlink RCC values and/or previously estimated downlink RCC values. For instance, the RAN node 102₂ may estimate the downlink specific RCC value based on the uplink radio condition for the wireless device 104₂ and may combine this with the RCC value estimated by the wireless device 104₂ itself when determining the downlink RCC value to be used for the wireless device 104₂. Further, the particular algorithm used by the RAN node 102₂ for determining the used downlink RCC value may be implementation dependent.

The RAN node 102₂ maps the determined downlink RCC value to a number of repeated downlink transmissions to be used for downlink message(s) 205 to the wireless device 104₂ (see FIG. 2's step 6 and graph "A"; note: the RAN node 102₂ also maps the downlink RCC value received in FIG. 2's step 4 to a number of repeated downlink transmissions to be used for the downlink message 204 transmitted to the wireless device 104₂). Then, the RAN node 102₂ transmits to the wireless device 104₂ a message 204 (e.g., Immediate Assignment message) that is repeated according to the downlink RCC value received from the wireless device 104₂ (see FIG. 2's step 6a). The message 204 would include the RAN node's determined downlink RCC value from FIG. 2's step 5 if it is different than the wireless device's downlink RCC value in message 202. Thereafter, the RAN node 102₂ transmits to the wireless device 104₂ the subsequent downlink message(s) 205 having a number of repeated downlink transmissions based on the RAN node's determined downlink RCC value (see FIG. 2's step 7). Basically, if the RAN node 102₂ decides to use a downlink RCC value that is different than the downlink RCC value sent by the wireless device 104₂ in FIG. 2's step 4, then the RAN node 102₂ will indicate this to the wireless device 104₂ by including the determined downlink RCC value in the first downlink message 204 which is always sent with repeated transmissions according to the downlink RCC value sent by the wireless device 104₂ in FIG. 2's step 4.

It should be noted that the number of repetitions can be different, for example, depending on the logical channel that is associated with the downlink message 204 or 205 to be transmitted to the wireless device $104_2$. For example, in GERAN, the RAN node $102_2$ can apply a first number of repeated transmissions according to the determined downlink RCC value when transmitting the Immediate Assignment message 204 on the Access Grant Channel (AGCH), but apply a second number of repetitions, for example, when transmitting a Packet Power Control/Timing Advance message 205 on the Packet Associated Control Channel (PACCH). Similarly, in the RAN node $102_2$, the number of repetitions used for Signaling Radio Bearers might be different from the number used for Data Radio Bearers.

Figure 3:
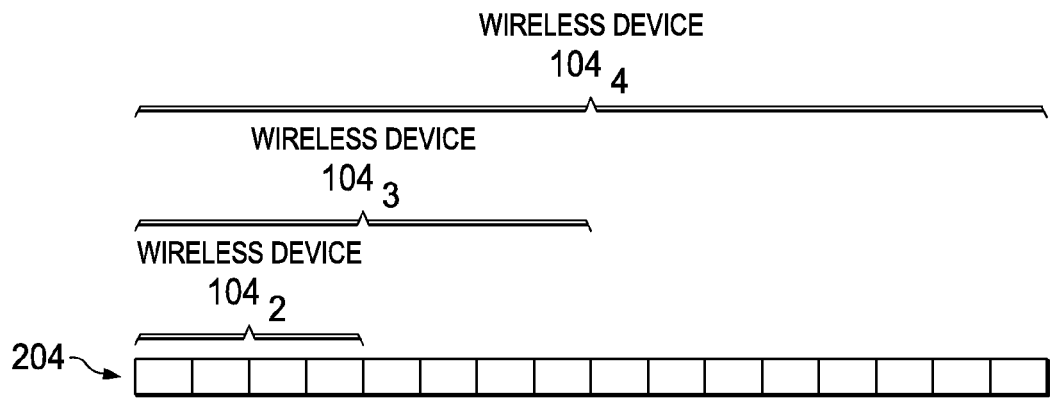
FIG. 3 is a diagram illustrating different wireless devices with different downlink RCC values being addressed by the same resource assignment message in accordance with an embodiment of the present disclosure.

It should be noted that when a repetition-only based scheme is used, and when multiple wireless devices $104_2$, $104_3$ and $104_4$ (for example) are addressed by the same message 204 or 205, there is no need for all the wireless devices $104_2$, $104_3$ and $104_4$ to have the same downlink RCC value. The number of repetitions used may instead be determined by the wireless device $104_4$ (for example) which has the highest downlink RCC value (i.e., the worst coverage). An example of this message format is illustrated in FIG. 3, where wireless devices $104_2$, $104_3$ and $104_4$ are addressed by the same resource assignment message 204. In this example, the resource assignment message 204 on the same AGCH is repeated 16 times due to the coverage class of wireless device $104_4$ (mapped to 16 repetitions), while wireless devices $104_2$ and $104_3$ which have lower coverage classes (i.e., fewer repetitions needed) will be able to read the same resource assignment message 204 after decoding the respective number of repetitions according to their RCC coverage class (i.e., 4 repetitions for wireless device $104_2$ and 8 repetitions for wireless device $104_3$).

In some embodiments, the same number of repeated transmissions according to the wireless device's downlink RCC value (which can be different depending on the logical channel considered) may be applied to any subsequent downlink messages 204, control or user plane messages 204, until the RAN node $102_2$ determines e.g., through the assistance of ACK/NACK or Measurement Report information supplied by the wireless device $104_2$ that a different downlink RCC value should be used for the wireless device $104_2$ (see FIG. 2's step 8). Any change in the downlink RCC value (number of repeated transmissions) may be signaled by the RAN node $102_2$ in the control plane either explicitly by means of dedicated signaling or implicitly e.g., through in-band signaling to the wireless device $104_2$ (see FIG. 2's step 9). When explicitly signaling a change in the downlink RCC value, the number of repeated transmissions used by the RAN node $102_2$ is determined using the downlink RCC value it has stored for the wireless device $104_2$ prior to deciding to make the change to the downlink RCC value. Similar to the downlink, the RAN node $102_2$ can estimate the RCC value applicable in the uplink for a given wireless device $104_2$. This process is described next with respect to FIG. 4.

Figure 4:
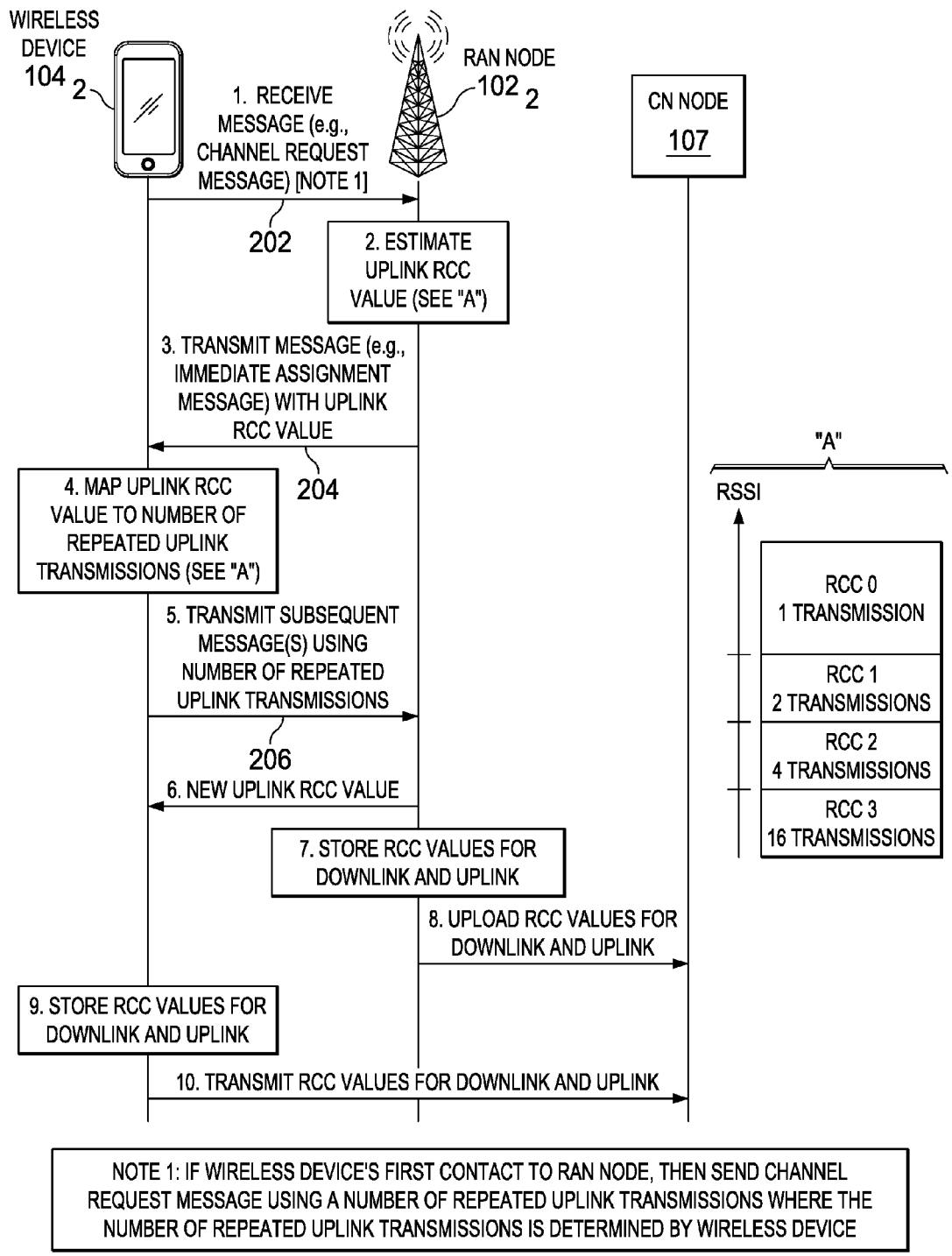
FIG. 4 is a signal flow diagram illustrating a RCC value determination process that occurs during a wireless device originated transfer in accordance with an embodiment of the present disclosure.

Referring to FIG. 4, there is a signal flow diagram illustrating an uplink RCC value determination process that occurs during a wireless device originated transfer in accordance with an embodiment of the present disclosure. The RAN node $102_2$ receives the message 202 (e.g., Channel Request message 202, RRC Connection Request message 202) on the RACH from the wireless device $104_2$ (see FIG. 4's step 1). For the case when the wireless device $104_2$ makes its first contact with the RAN node $102_2$ after the wireless device's initial deployment and power on in the field or when it wakes up to perform a system access procedure following a period of sleep, the number of repeated retransmissions the wireless device $104_2$ uses when sending RACH bursts for the Channel Request message 202 (RRC Connection Request message 202) on the RACH may be based, for example, on the wireless device's own independent assessment of an appropriate uplink RCC value (e.g., based on the estimated downlink radio condition of FIG. 2's step 2) or pre-configured information (see FIG. 4's note 1).

The RAN node $102_2$ estimates an uplink RCC value based on a quality (e.g., RSSI) of the received message 202 (see FIG. 4's step 2 and graph "A"). In this example, an RSSI-based mapping measurement is illustrated where an estimated RSSI value of uplink radio conditions associated with the received message 202 is mapped to one of four different uplink RCC values. It is to be noted that the number of uplink RCC values and the number of transmissions for uplink RCC values illustrated in FIG. 4 (i.e., 1 transmission for RCC 0, 2 transmissions for RCC 1, 4 transmissions for RCC 2, and 16 transmissions for RCC 3) are provided as examples. In other cases, there may be fewer or more uplink RCC values and/or different numbers of transmissions may be associated with the uplink RCC values.

The RAN node $102_2$ adds (inserts, includes) the uplink RCC value to the message 204 (e.g., Immediate Assignment message 204 or any other RRC message 204 following the Channel Request message 202) transmitted to the one wireless device $104_2$ (see FIG. 4's step 3). The uplink RCC value communicated to the wireless device $104_2$ may be, for example, the last uplink RCC value estimated by the RAN node $102_2$, a running average of the previously estimated uplink RCC values, and/or estimated or used downlink RCC values for that particular wireless device $104_2$.

The wireless device $104_2$ maps the uplink RCC value into a number of uplink repetitions (see FIG. 4's step 4 and graph "A'). Then, prior to the termination of the connection, the wireless device $104_2$ applies the number of uplink repetitions on all subsequent uplink messages 206 transmitted on the RACH and on the uplink of any subsequently assigned Packet Data Traffic Channels (PDTCHs) or Packet Associated Control Channels (PACCHs) to the RAN node $102_2$ (see FIG. 4's step 5). Following the termination of the connection the wireless device $104_2$ could optionally continue to use its stored uplink RCC value (see FIG. 4's step 9) for subsequent uplink messages 202 transmitted on the RACH (see FIG. 4's step 1) if they are transmitted within a limited time period following its most recent reception of the uplink RCC value in the message 204 (see FIG. 4's step 3).

The wireless device $104_2$ continues to use the uplink RCC value for the uplink messages 206 until a new uplink RCC value is received from the RAN node $102_2$ (see FIG. 4's step 6). The wireless device $104_2$ can receive the new uplink RCC value from the RAN node $102_2$, for example, either in a control message or in an implicit manner (e.g., Packet Uplink ACK/NACK message indicating a failed uplink reception).

The RAN node $102_2$ may store the RCC values applicable to both the uplink and downlink along with a Temporary Logical Link Identifier (TLLI) or other local relevant identifier of the wireless device $104_2$ (see FIG. 4's step 7; note: step 7 is also typically performed immediately after or as part of step 2). Then, upon termination of the connection (e.g., RRC connection) between the RAN node $102_2$ and the wireless device $104_2$, the RAN node $102_2$ may transmit the RCC values applicable to both the uplink and downlink along with a TLLI or other local relevant identifier of the wireless device $104_2$ to the CN node 107 (see FIG. 4's step 8). For instance, the RAN node $102_2$ can include the uplink and downlink RCC values as supplemental information when sending the received messages 206 of step 5 to the CN 107. Additionally or alternatively, the wireless device 104$_2$ may store the RCC values applicable to both the uplink and downlink (see FIG. 4's step 9; note: step 9 can also occur immediately after step 1 and step 4). Furthermore, the wireless device 104$_2$ may transmit the RCC values for both the uplink and downlink to the CN node 107, for example, via NAS signaling (e.g., within a periodic Routing Area Update (RAU) message) (see FIG. 4's step 10). In this case, if wireless device 104$_2$ performs step 10 then the RAN node 102$_2$ would not need to include the uplink and downlink RCC values as supplemental information when sending the received messages 206 of step 5 to the CN 107.

Figure 5:
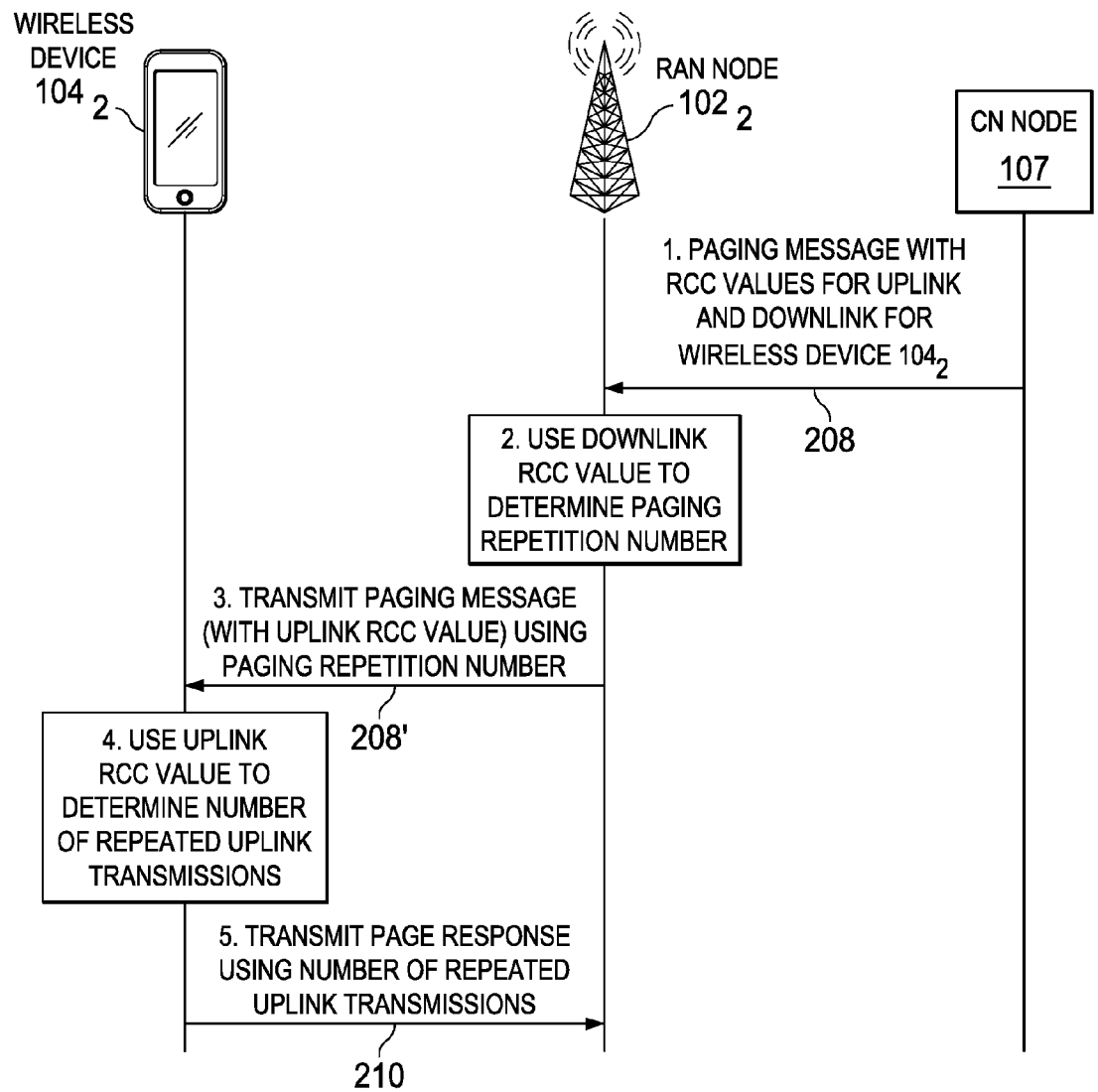
FIG. 5 is a signal flow diagram illustrating a process associated with a wireless device terminated transfer in accordance with an embodiment of the present disclosure.

Referring to FIG. 5, there is a signal flow diagram illustrating a process associated with a wireless device terminated transfer in accordance with an embodiment of the present disclosure. The CN node 107 supplies the RAN node 102$_2$ with stored RCC values for the uplink and the downlink for the wireless device 104$_2$ during a subsequent wireless device terminated transfer. More specifically, the CN node 107 transmits a paging message 208 with the stored RCC values for uplink and downlink when a downlink payload becomes available for the wireless device 104$_2$ (see FIG. 5's step 1). Recall: the RAN node 102$_2$ and/or the wireless device 104$_2$ at the end of the previous connection uploaded the RCC values for the uplink and downlink to the CN node 107 (see FIG. 4's steps 8 and 10).

The RCC values for both uplink and downlink may be sent together in the paging message 208 with a time stamp indicating the time that the RCC values had been uploaded to the CN node 107 and including cell identifier information about the cell where the wireless device 104$_2$ was connected when these RCC values were obtained. This information and if desired additional information may also be provided in the paging message 208 to enable the RAN node 102$_2$ to assess the reliability of the downlink and uplink RCC values. The RCC values for uplink and downlink may be sent with the paging message 208 using the relevant interface, e.g., Gb, Iu, S1AP.

The RAN node 102$_2$ (e.g., the BSC 102$_2$ in 2G, the RNC 102$_2$ in 3G, or the eNB 102$_2$ in LTE) may use the received downlink RCC value to determine the paging repetition number for the paging message 208' which is to be transmitted to the wireless device 104$_2$ (see FIG. 5's step 2). The RAN node 102$_2$ then transmits the paging message 208' using the determined paging repetition number to the wireless device 104$_2$ (see FIG. 5's step 3). Furthermore, the RAN node 102$_2$ may add the uplink RCC value to the paging message 208' itself and thus enable the wireless device 104$_2$ to map and use a specific number of uplink repetitions during the random access procedure triggered to transmit a corresponding page response 210 to the RAN node 102$_2$ (see FIG. 5's steps 4 and 5). Alternatively, the RAN node 102$_2$ can determine that the RCC values for the uplink and downlink received from the CN node 107 are outdated, then in this case the paging message 208' sent to the wireless device 104$_2$ may be repeated a maximum number of times, and the uplink RCC value communicated in the paging message 208' to the wireless device 104$_2$ may be set to the highest value (i.e., a maximum number of repetitions) (see FIG. 5's note 1). The subsequent behavior by the wireless device 104$_2$ and the RAN node 102$_2$ may be the same as described above in reference to wireless device originated transfer in FIGS. 2-4.

Detailed Techniques Implemented by Devices

Figure 6:
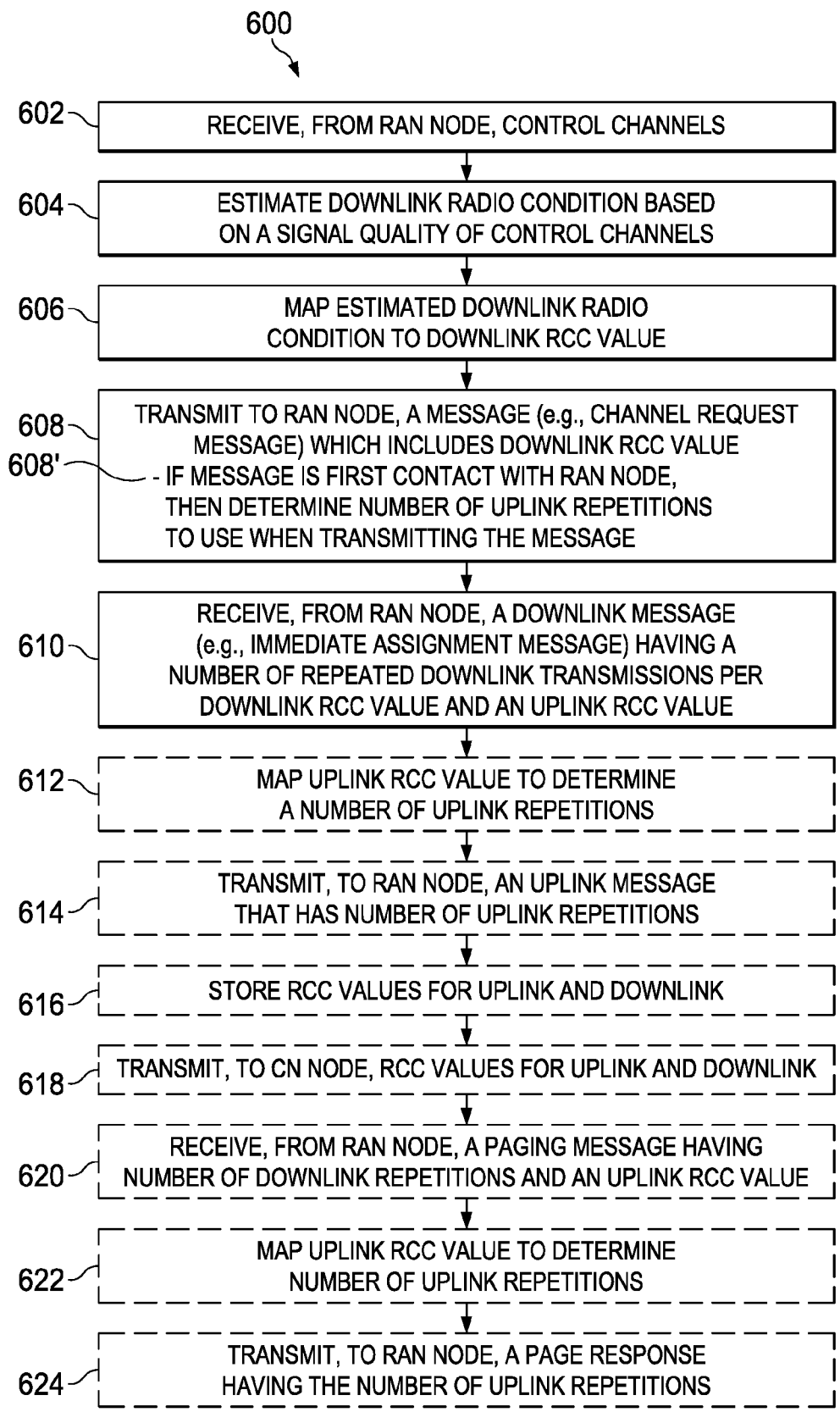
FIG. 6 is a flowchart of a method implemented in a wireless device in accordance with an embodiment of the present disclosure.

Referring to FIG. 6, there is a flowchart of a method 600 implemented in a wireless device 104$_2$ (for example) in accordance with an embodiment of the present disclosure. At step 602, the wireless device 104$_2$ receives (e.g., monitors) some RAT specific set of control channels in order to, for example, obtain the synchronization with the RAN node 102$_2$ (see FIG. 2's step 1). At step 604, the wireless device 104$_2$ estimates a downlink radio condition based on a signal quality (e.g., RSSI) of the received control channels (see FIG. 2's step 2). At step 606, the wireless device 104$_2$ maps the estimated downlink radio condition to one of multiple downlink RCC values (see FIG. 2's step 3 and graph "A") (note: the wireless device 104$_2$ per step 606 may also map the estimated downlink radio condition to one of a plurality of uplink RCC values—see FIGS. 15A and 16A). At step 608, the wireless device 104$_2$ transmits a message 202 (e.g. Channel Request message 202) which includes the downlink RCC value to the RAN node 102$_2$ (see FIG. 2's step 4). If the message 202 (e.g., Channel Request message 202) is the wireless device's first contact with the RAN node 102$_2$, then the wireless device 104$_2$ may have previously determined at step 608' an estimated number of repeated uplink transmissions (e.g., based on the estimated downlink radio condition or preconfigured information) to use when transmitting the message 202 to the RAN node 102$_2$ (see FIG. 4's note 1).

At step 610, the wireless device 104$_2$ receives a downlink message 204 (e.g., Immediate Assignment message 204) having a number of repeated downlink transmissions and including an uplink RCC value (see FIG. 2's step 7 and FIG. 4's step 3). Recall: the number of repeated downlink transmissions in the downlink message 204 is based on the downlink RCC value sent by the wireless device 104$_2$ in message 202 (see FIG. 2's step 4 and FIG. 4's step 1). Plus, the message 204 may include the RAN node's determined downlink RCC value which is to be used for the subsequent downlink messages 205 (see FIG. 2's step 6a). At step 612, the wireless device 104$_2$ maps the uplink RCC value (included in message 204) to determine a number of uplink repetitions (see FIG. 4's step 4 and graph "A'). At step 614, the wireless device 104$_2$ transmits an uplink message 206 that is repeated according to the number of repeated uplink transmissions to the RAN node 102$_2$ (see FIG. 4's step 5). The wireless device 104$_2$ would continue to use the uplink RCC value for the subsequent uplink messages 206 until a new uplink RCC value is received from the RAN node 102$_2$ (see FIG. 4's step 6). At step 616, the wireless device 104$_2$ stores the RCC values applicable to both the uplink and downlink (see FIG. 4's step 9). At step 618, the wireless device 104$_2$ may transmit the RCC values for both the uplink and downlink to the CN node 107 (see FIG. 4's step 10).

At step 620, the wireless device 104$_2$ receives from the RAN node 102$_2$ the paging message 208' having a number of downlink repetitions and an uplink RCC value (see FIG. 5's step 3; recall: the paging message 208' would be sent when the CN node 107 has new downlink payload for the wireless device 104$_2$). The number of repeated downlink repetitions used in the paging message 208' may be based on the downlink RCC value previously sent by the wireless device 104$_2$ or the RAN node 102$_2$ to the CN node 107 (see FIG. 5's steps 1-2) or a maximum number of downlink repetitions (see FIG. 5's note 1). The uplink RCC value in the paging message 208' may be the uplink RCC value previously sent by the wireless device 104$_2$ or the RAN node 102$_2$ to the CN node 107 (see FIG. 5's steps 1-2) or a maximum number of uplink repetitions (see FIG. 5's note 1). At step 622, the wireless device 104$_2$ maps the uplink RCC value to determine a specific number of uplink repetitions to use when transmitting the corresponding page response 210 to the RAN node 102$_2$ (see FIG. 5's step 4). At step 624, the wireless device $104_2$ transmits the page response 210 using the determined number of uplink repetitions to the RAN node $102_2$ (see FIG. 5's step 5). For a more detailed discussion about steps 602, 604, 606, 608, 610, 612, 614, 616, 618, 620, 622 and 624 reference is made to FIGS. 2, 4 and 5. Note: the wireless device $104_2$ can also be configured to implement the aforementioned steps and the bold steps shown in FIGS. 15A-15B, 16A-16B, and 21.

Figure 7:
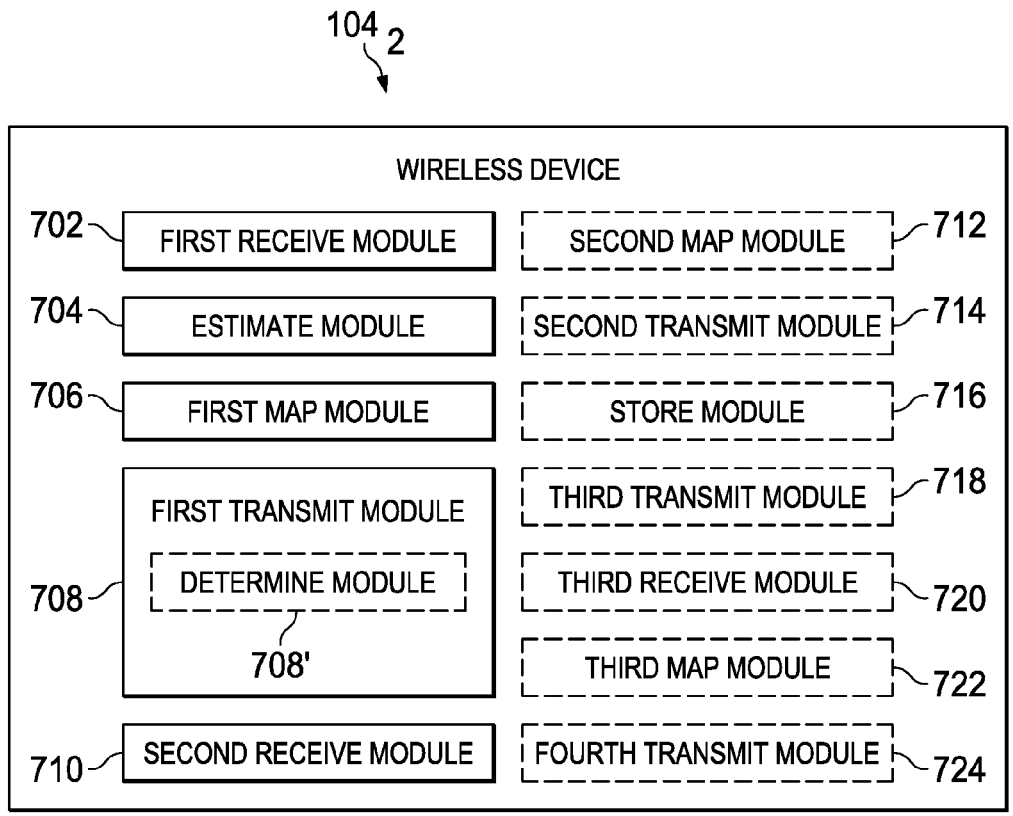
FIG. 7 is a block diagram illustrating structures of an exemplary wireless device in accordance with an embodiment of the present disclosure.

Referring to FIG. 7, there is a block diagram illustrating structures of an exemplary wireless device $104_2$ configured to interact with the RAN node $102_2$ and the CN node 107 in accordance with an embodiment of the present disclosure. In an embodiment, the wireless device $104_2$ may comprise a first receive module 702, an estimate module 704, a first map module 706, a first transmit module 708, a second receive module 710, a second map module 712, a second transmit module 714, a store module 716, a third transmit module 718, a third receive module 720, a third map module 722, and a fourth transmit module 724.

The first receive module 702 is configured to receive (e.g., monitor) some RAT specific set of control channels in order to, for example, obtain the synchronization with the RAN node $102_2$ radio interface (see FIG. 2's step 1). The estimate module 704 is configured to estimate a downlink radio condition based on a signal quality (e.g., RSSI) of the received control channels (see FIG. 2's step 2). The first map module 706 is configured to map the estimated downlink radio condition to one of multiple downlink RCC values (see FIG. 2's step 3 and graph "A"). The first transmit module 708 is configured to transmit a message 202 (e.g. Channel Request message 202) which includes the downlink RCC value to the RAN node $102_2$ (see FIG. 2's step 4). The first transmit module 708 may include a determine module 708' configured to determine an estimated number of repeated uplink transmissions (e.g., based on the estimated downlink radio condition or preconfigured information) to use when transmitting the message 202 to the RAN node $102_2$ if the message 202 (e.g., Channel Request message 202) is the wireless device's first contact with the RAN node $102_2$, (see FIG. 4's note 1).

The second receive module 710 is configured to receive a downlink message 204 (e.g., Immediate Assignment message 204) having a number of repeated downlink transmissions and including an uplink RCC value (see FIG. 2's step 7 and FIG. 4's step 3). Recall: the number of repeated downlink transmissions in the downlink message 204 is based on the downlink RCC value sent by the wireless device $104_2$ in message 202 (see FIG. 2's step 4 and FIG. 4's step 1). Plus, the message 204 may include the RAN node's determined downlink RCC value which is to be used for the subsequent downlink messages 205 (see FIG. 2's step 6a). The second map module 712 is configured to map the uplink RCC value (included in message 204) to determine a number of uplink repetitions (see FIG. 4's step 4 and graph "A'). The second transmit module 714 is configured to transmit an uplink message 206 that has the estimated number of repeated uplink transmissions to the RAN node $102_2$ (see FIG. 4's step 5). The second transmit module 714 would continue to use the uplink RCC value for the subsequent uplink messages 206 until a new uplink RCC value is received from the RAN node $102_2$ (see FIG. 4's step 6). The store module 716 is configured to store the RCC values applicable to both the uplink and downlink (see FIG. 4's step 9). The third transmit module 718 is configured to transmit the RCC values for both the uplink and downlink to the CN node 107 (see FIG. 4's step 10).

The third receive module 720 is configured to receive from the RAN node $102_2$ the paging message 208' having a number of downlink repetitions and an uplink RCC value (see FIG. 5's step 3; recall: the paging message 208' would be sent when the CN node 107 has new downlink payload for the wireless device $104_2$). The number of repeated downlink repetitions used in the paging message 208' may be based on the downlink RCC value previously sent by the wireless device $104_2$ or the RAN node $102_2$ to the CN node 107 (see FIG. 5's steps 1-2) or a maximum number of downlink repetitions (see FIG. 5's note 1). The uplink RCC value in the paging message 208' may be the uplink RCC value previously sent by the wireless device $104_2$ or the RAN node $102_2$ to the CN node 107 (see FIG. 5's steps 1-2) or a maximum number of uplink repetitions (see FIG. 5's note 1). The third map module 722 is configured to map the uplink RCC value to determine a specific number of uplink repetitions to use when transmitting the corresponding page response 210 to the RAN node $102_2$ (see FIG. 5's step 4). The fourth transmit module 724 is configured to transmit the page response 210 using the determined number of uplink repetitions to the RAN node $102_2$ (see FIG. 5's step 5).

As those skilled in the art will appreciate, the above-described modules 702, 704, 706, 708, 710, 712, 714, 716, 718, 720, 722 and 724 of the wireless device $104_2$ may be implemented separately as suitable dedicated circuits. Further, the modules 702, 704, 706, 708, 710, 712, 714, 716, 718, 720, 722 and 724 can also be implemented using any number of dedicated circuits through functional combination or separation. In some embodiments, the modules 702, 704, 706, 708, 710, 712, 714, 716, 718, 720, 722 and 724 may be even combined in a single application specific integrated circuit (ASIC). As an alternative software-based implementation, the wireless device $104_2$ may comprise a memory $120_2$, a processor $118_2$ (including but not limited to a microprocessor, a microcontroller or a Digital Signal Processor (DSP), etc.) and a transceiver $110_2$. The memory $120_2$ stores machine-readable program code executable by the processor $118_2$ to cause the wireless device $104_2$ to perform the steps of the above-described method 600 and also the steps shown in FIGS. 15A-15B, 16A-16B, and 21.

Figure 8A:
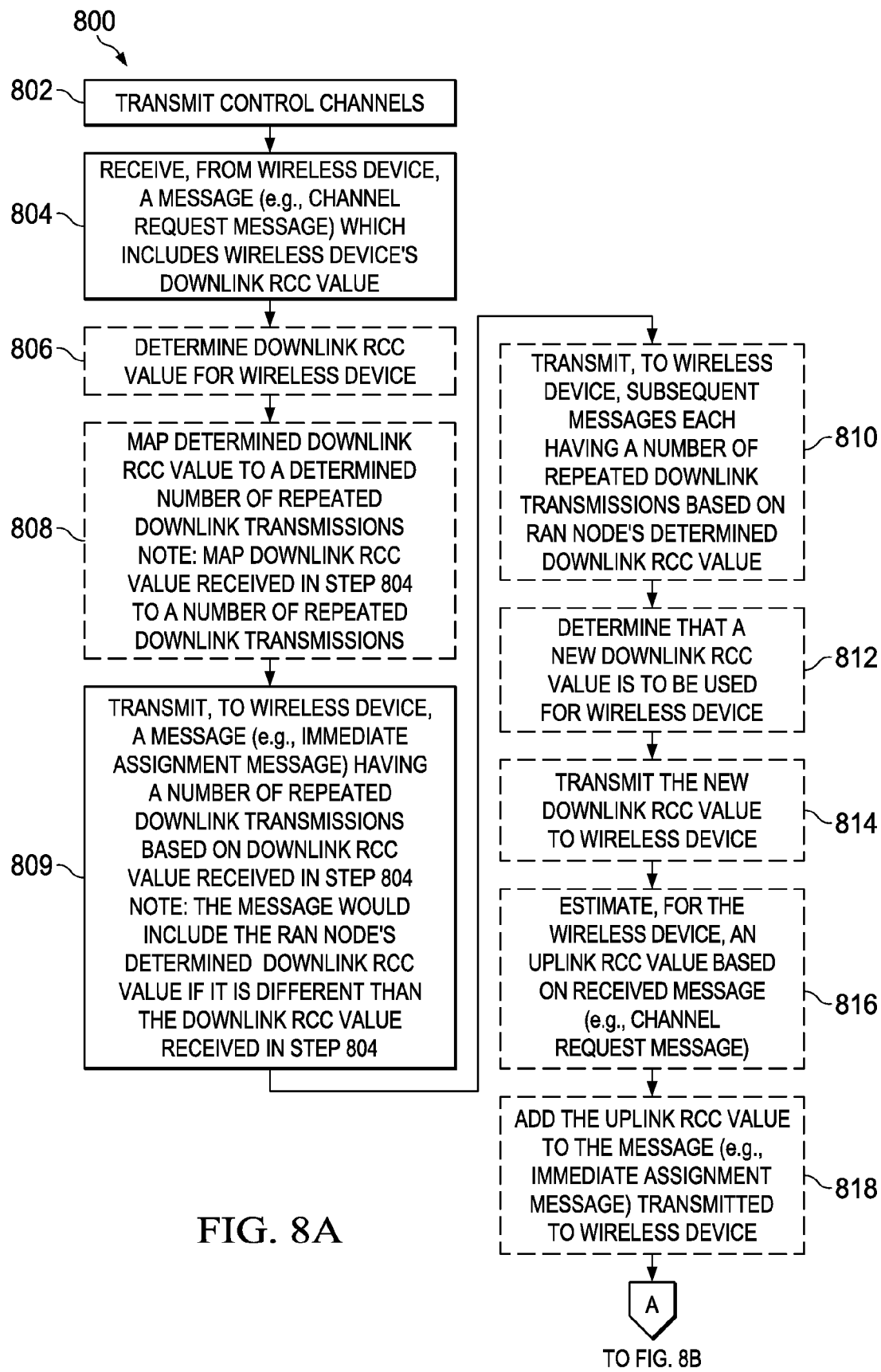
FIGS. 8A-8B is a flowchart of a method implemented in a RAN node in accordance with an embodiment of the present disclosure.
Figure 8B:
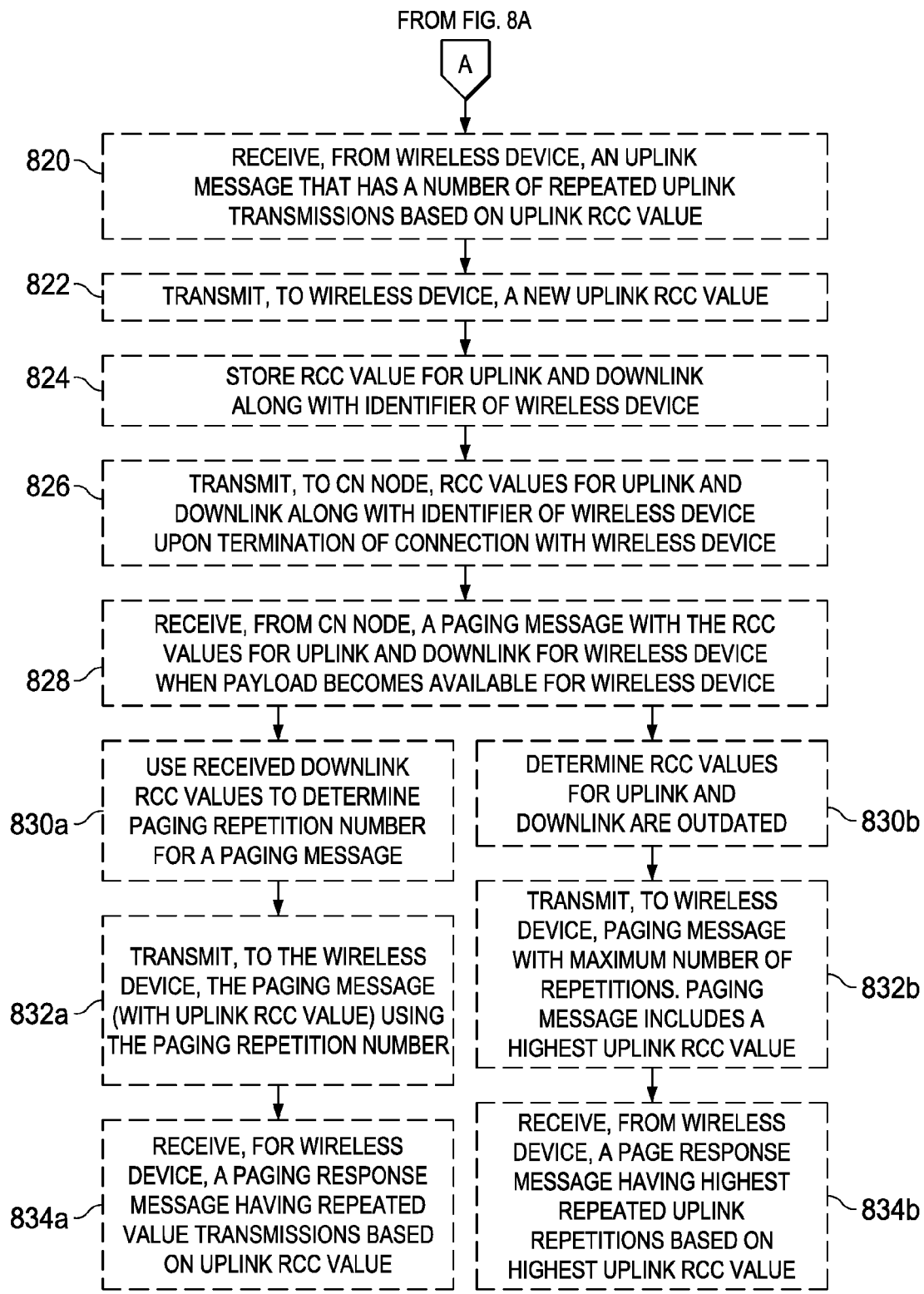

Referring to FIGS. 8A-8B, there is a flowchart of a method 800 implemented in a RAN node $102_2$ (for example) in accordance with an embodiment of the present disclosure. At step 802, the RAN node $102_2$ transmits control channels (e.g., BCCH, SCH, FCCH) to enable the wireless device $104_2$ (for example) to obtain synchronization with the RAN node $102_2$ (see FIG. 2's step 1). At step 804, the RAN node $102_2$ receives from the wireless device $104_2$ a message 202 (e.g., Channel Request message 202) which includes the wireless device's downlink RCC value (see FIG. 2's step 4). At step 806, the RAN node $102_2$ determines a downlink RCC value to be used for the wireless device $104_2$ (see FIG. 2's step 5). At step 808, the RAN node $102_2$ maps the determined downlink RCC value to a number of repeated downlink transmissions to be used for downlink message(s) 205 transmitted to the wireless device $104_2$ (see FIG. 2's step 6 and graph "A"; note: the RAN node $102_2$ also maps the downlink RCC value received in FIG. 8's step 804 to a number of repeated downlink transmissions to be used for the downlink message 204 transmitted to the wireless device $104_2$). At step 809, the RAN node $102_2$ transmits a first downlink message 204 (e.g., Immediate Assignment message 204) to the wireless device $104_2$ (see FIG. 2's step 7) where the number of repeated downlink transmissions used for the downlink message 204 is based on the downlink RCC value sent by the wireless device $104_2$ in message 202 (see FIG. 2's step 4). If the RAN node $102_2$ decides to use a downlink RCC value that is different than the downlink RCC value received from the wireless device $104_2$ in step 804, then the RAN node $102_2$ will indicate this to the wireless device $104_2$ by including the determined downlink RCC value from step 806 in the first downlink message 204. Subsequent downlink messages 205 are then transmitted at step 810 by the RAN node $102_2$ to the wireless device $104_2$ based on the determined downlink RCC value from step 806. At step 812, the RAN node $102_2$ determines e.g., through the assistance of ACK/NACK or Measurement Report information supplied by the wireless device $104_2$ that a new downlink RCC value should be used for the wireless device $104_2$ (see FIG. 2's step 8). At step 814, the RAN node $102_2$ transmits the new downlink RCC value (number of repeated transmissions) to the wireless device $104_2$ (see FIG. 2's step 9). The number of repeated transmissions used by the RAN node $102_2$ to transmit the message which contains the new downlink RCC value is determined using the downlink RCC value it has stored for the wireless device $104_2$ prior to deciding to use a new downlink RCC value.

At step 816, the RAN node $102_2$ upon receiving the message 202 (e.g., Channel Request message 202) at step 804 will also estimate an uplink RCC value for the wireless device $104_2$ based on a quality (e.g., RSSI) of the received message 202 (see FIG. 4's step 2 and graph "A"). At step 818, the RAN node $102_2$ adds (inserts, includes) the estimated uplink RCC value to the message 204 (e.g., Immediate Assignment message 204) that is transmitted during step 810 to the one wireless device $104_2$ (see FIG. 4's step 3). At step 820, the RAN node $102_2$ receives from the wireless device $104_2$ at least one uplink message 206 that has the number of repeated uplink transmissions which corresponds to the uplink RCC value sent in message 204 (see FIG. 4's step 5). At step 822, the RAN node $102_2$ transmits a new uplink RCC value if needed to the wireless device $104_2$ (see FIG. 4's step 6). At step 824, the RAN node $102_2$ stores the RCC values applicable to both the uplink and downlink along with a TLLI or other local relevant identifier of the wireless device $104_2$ (see FIG. 4's step 7). At step 826, the RAN node $102_2$ may transmit the RCC values applicable to both the uplink and downlink to the CN node 107 along with a TLLI or other local relevant identifier of the wireless device $104_2$ upon the termination of the connection between the wireless device $104_2$ and the RAN node $102_2$ (see FIG. 4's step 8).

At step 828, the RAN node $102_2$ receives from the CN node 107 the paging message 208 with the RCC values for uplink and downlink for the wireless device $104_2$ when a downlink payload becomes available for the wireless device $104_2$ (see FIG. 5's step 1). At step 830a, the RAN node $102_2$ may use the received downlink RCC value to determine the paging repetition number for the paging message 208' which is to be transmitted to the wireless device $104_2$ (see FIG. 5's step 2). At step 832a, the RAN node $102_2$ transmits the paging message 208' (which includes the uplink RCC value) using the determined paging repetition number to the wireless device $104_2$ (see FIG. 5's step 3). At step 834a, the RAN node $102_2$ receives from the wireless device $104_2$ the page response 210 having a number of repeated uplink transmissions based on the uplink RCC value in the paging message 208' (see FIG. 5's step 5). Alternatively, after step 828 the RAN node $102_2$ at step 830b determines that the RCC values for the uplink and downlink received from the CN node 107 are outdated, then in this case the paging message 208' transmitted at step 834b to the wireless device $104_2$ may be repeated a maximum number of times and the uplink RCC value communicated in the paging message 208' to the wireless device $104_2$ may be set to the highest RCC value (i.e., a maximum number of repetitions) (see FIG. 5's note 1). It should be noted that in practice the wireless device $104_2$ would typically be listening according to the last downlink RCC value it conveyed to the network 100 and so it may not be very helpful for the RAN node $102_2$ to autonomously decide to use the maximum number of repetitions. At step 834b, the RAN node $102_2$ receives from the wireless device $104_2$ the page response 210 having a highest number of repeated uplink transmissions based on the highest uplink RCC value.

Figure 9:
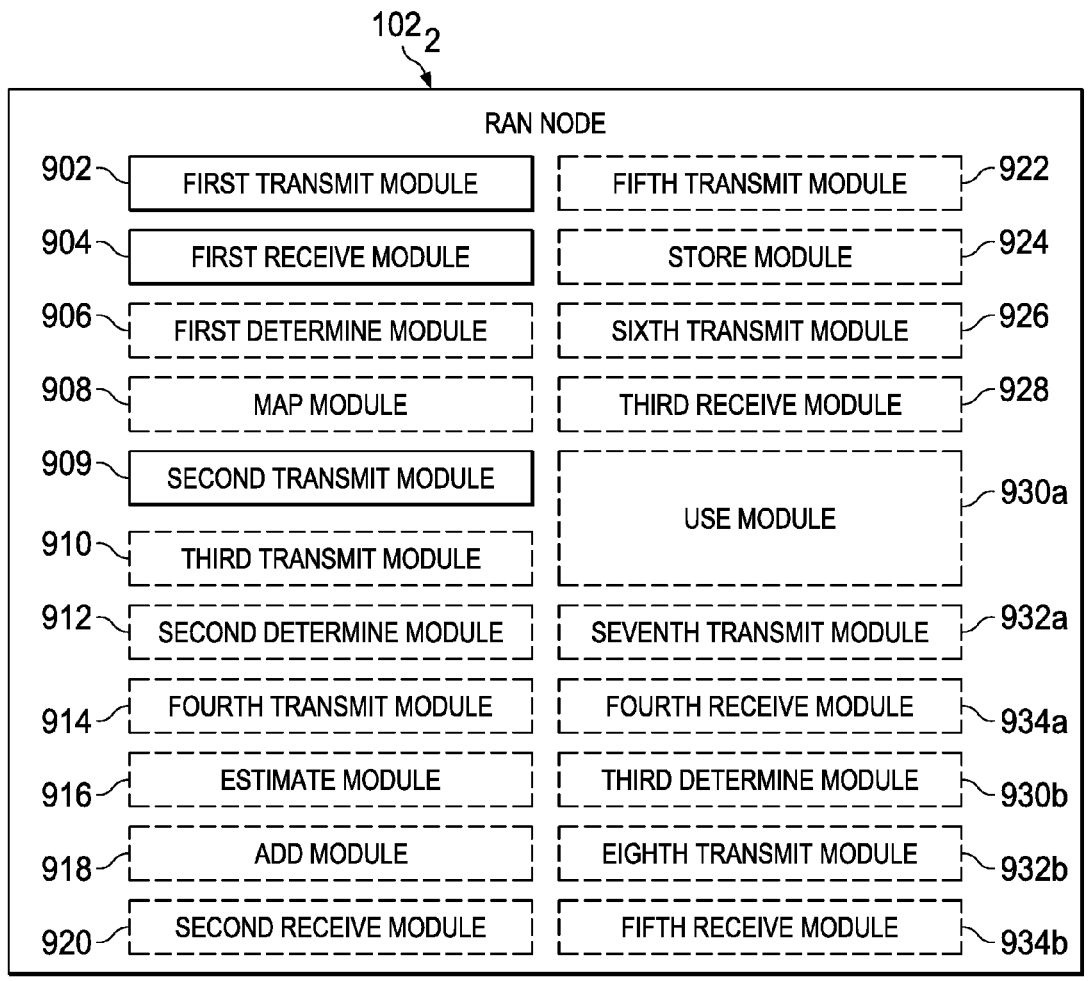
FIG. 9 is a block diagram illustrating structures of an exemplary RAN node in accordance with an embodiment of the present disclosure.

Referring to FIG. 9, there is a block diagram illustrating structures of an exemplary RAN node $102_2$ configured to interact with a wireless device $104_2$ and a CN node 107 in accordance with an embodiment of the present disclosure. In an embodiment, the RAN node $102_2$ may comprise a first transmit module 902, a first receive module 904, a first determine module 906, a map module 908, a second transmit module 909, a third transmit module 910, a second determine module 912, a fourth transmit module 914, an estimate module 916, an add module 918, a second receive module 920, a fifth transmit module 922, a store module 924, a sixth transmit module 926, a third receive module 928, a use module 930a, a seventh transmit module 932a, a fourth receive module 934a, a third determine module 930b, an eighth transmit module 932b, and a fifth receive module 934b.

The first transmit module 902 is configured to transmit control channels (e.g., BCCH, SCH, FCCH) to enable the wireless device $104_2$ (for example) to obtain synchronization with the RAN node $102_2$ (see FIG. 2's step 1). The first receive module 904 is configured to receive from the wireless device $104_2$ a message 202 (e.g., Channel Request message 202) which includes the wireless device's downlink RCC value (see FIG. 2's step 4). The first determine module 906 is configured to determine a downlink RCC value to be used for the wireless device $104_2$ (see FIG. 2's step 5). The map module 908 is configured to map the determined downlink RCC value to one of a multiple of downlink RCC values to determine a number of repeated downlink transmissions to be used for downlink message(s) 204 transmitted to the wireless device $104_2$ (see FIG. 2's step 6 and graph "A"; note: the map module 908 also maps the downlink RCC value received in FIG. 2's step 4 to a number of repeated downlink transmissions to be used for the downlink message 204 transmitted to the wireless device $104_2$). The second transmit module 909 is configured to transmit a first downlink message 204 (e.g., Immediate Assignment message 204) to the wireless device $104_2$ (see FIG. 2's step 7) where the number of repeated downlink transmissions used for the downlink message 204 is based on the downlink RCC value sent by the wireless device $104_2$ in message 202 (see FIG. 2's step 4) (see FIG. 2's step 6a). If the first determine module 906 decides to use a downlink RCC value that is different than the downlink RCC value sent by the wireless device $104_2$, then the second transmit module 909 will indicate this to the wireless device $104_2$ by including the determined downlink RCC value in the first downlink message 204. The third transmit module 910 is configured to transmit subsequent downlink messages 205 to the wireless device $104_2$ based on the determined downlink RCC value (see FIG. 2's step 7). The second determine module 912 is configured to determine e.g., through the assistance of ACK/NACK or Measurement Report information supplied by the wireless device $104_2$ that a new downlink RCC value should be used for the wireless device $104_2$ (see FIG. 2's step 8). The fourth transmit module 914 is configured to transmit the new downlink RCC value (number of repeated transmissions) to the wireless device 104₂ (see FIG. 2's step 9). The number of repeated transmissions used by the RAN node 102₂ to transmit the message which contains the new downlink RCC value is determined using the downlink RCC value it has stored for the wireless device 104₂ prior to deciding to use a new downlink RCC value.

The estimate module 916 is configured upon receipt of the message 202 (e.g., Channel Request message 202) to estimate an uplink RCC value for the wireless device 104₂ based on a quality (e.g., RSSI) of the received message 202 (see FIG. 4's step 2 and graph "A"). The add module 918 is configured to add (insert, include) the estimated uplink RCC value to the message 204 (e.g., Immediate Assignment message 204) that is transmitted to the one wireless device 104₂ (see FIG. 4's step 3). The second receive module 920 is configured to receive from the wireless device 104₂ at least one uplink message 206 that has the number of repeated uplink transmissions which corresponds to the uplink RCC value sent in message 204 (see FIG. 4's step 5). The fifth transmit module 922 is configured to transmit a new uplink RCC value if needed to the wireless device 104₂ (see FIG. 4's step 6). The store module 924 is configured to store the RCC values applicable to both the uplink and downlink along with a TLLI or other local relevant identifier of the wireless device 104₂ (see FIG. 4's step 7). The sixth transmit module 926 is configured to transmit the RCC values applicable to both the uplink and downlink to the CN node 107 along with a TLLI or other local relevant identifier of the wireless device 104₂ upon the termination of the connection between the wireless device 104₂ and the RAN node 102₂ (see FIG. 4's step 8).

The third receive module 928 is configured to receive from the CN node 107 the paging message 208 with the RCC values for uplink and downlink for the wireless device 104₂ when a downlink payload becomes available for the wireless device 104₂ (see FIG. 5's step 1). The use module 930a is configured to use the received downlink RCC value to determine the paging repetition number for the paging message 208' which is to be transmitted to the wireless device 104₂ (see FIG. 5's step 2). The seventh transmit module 932a is configured to transmit the paging message 208' (which includes the uplink RCC value) using the determined paging repetition number to the wireless device 104₂ (see FIG. 5's step 3). The fourth receive module 934a is configured to receive from the wireless device 104₂ the page response 210 having a number of repeated uplink transmissions based on the uplink RCC value in the paging message 208' (see FIG. 5's step 5). As an alternative to modules 930a, 932a and 934a, the RAN node 102₂ includes the third determine module 930b which is configured to determine that the RCC values for the uplink and downlink received from the CN node 107 are outdated, then the eighth transmit module 932b is configured to transmit the paging message 208' a repeated a maximum number of times to the wireless device 104₂, where the paging message 208' may include an uplink RCC value set to the highest RCC value (i.e., a maximum number of repetitions) (see FIG. 5's note 1). The fifth receive module 934b is configured to receive from the wireless device 104₂ the page response 210 having a highest number of repeated uplink transmissions based on the highest uplink RCC value.

As those skilled in the art will appreciate, the above-described modules 902, 904, 906, 908, 909, 910, 912, 914, 916, 918, 920, 922, 924, 926, 928, 930a, 930b, 932a, 932b, 934a, and 934b of the RAN node 102₂ may be implemented separately as suitable dedicated circuits. Further, the modules 902, 904, 906, 908, 909, 910, 912, 914, 916, 918, 920, 922, 924, 926, 928, 930a, 930b, 932a, 932b, 934a, and 934b can also be implemented using any number of dedicated circuits through functional combination or separation. In some embodiments, the modules 902, 904, 906, 908, 909, 910, 912, 914, 916, 918, 920, 922, 924, 926, 928, 930a, 930b, 932a, 932b, 934a, and 934b may be even combined in a single application specific integrated circuit (ASIC). As an alternative software-based implementation, the RAN node 102₂ may comprise a memory 134₂, a processor 132₂ (including but not limited to a microprocessor, a microcontroller or a Digital Signal Processor (DSP), etc.) and a transceiver 122₂. The memory 134₂ stores machine-readable program code executable by the processor 132₂ to cause the RAN node 102₂ to perform the steps of above-described method 800.

Figure 10:
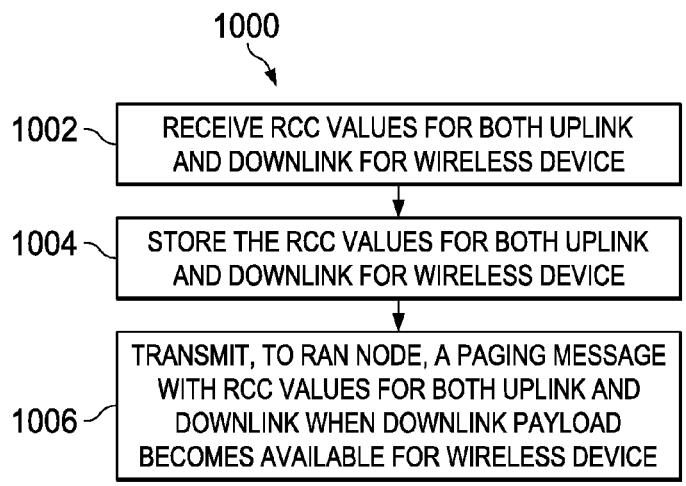
FIG. 10 is a flowchart of a method implemented in a CN node in accordance with an embodiment of the present disclosure.

Referring to FIG. 10, there is a flowchart of a method 1000 implemented in a CN node 107 in accordance with an embodiment of the present disclosure. At step 1002, the CN node 107 receives the RCC values for both the uplink and downlink from either or both of the wireless device 104₂ and the RAN node 102₂ after the termination of the connection between the wireless device 104₂ and the RAN node 102₂ (see FIG. 4's steps 8 and 10). At step 1004, the CN node 107 stores the downlink RCC value and the uplink RCC value associated with the one wireless device. At step 1006, the CN node 107 transmits to the RAN node 102₂ the paging message 208 with the RCC values for uplink and downlink for the wireless device 104₂ when a downlink payload becomes available for the wireless device 104₂ (see FIG. 5's step 1). The RCC values for both uplink and downlink may be sent together in the paging message 208 with a time stamp indicating the time that the RCC values had been uploaded to the CN node 102₂ and cell identifier information about the cell where the wireless device 104₂ was connected when these RCC values were obtained. This information and if desired additional information may also be provided in the paging message 208 to enable the RAN node 102₂ to assess the reliability of the downlink and uplink RCC values.

Figure 11:
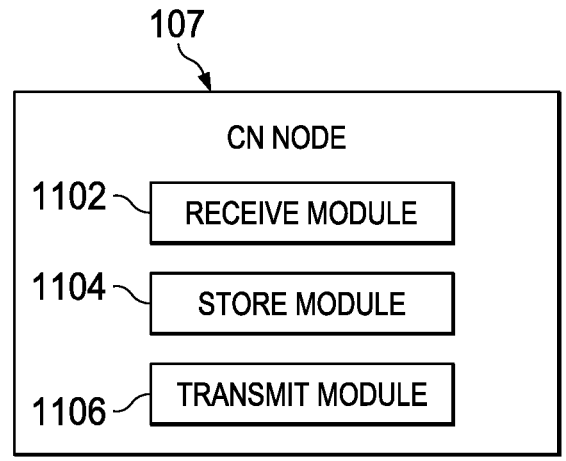
FIG. 11 is a block diagram illustrating structures of an exemplary CN node in accordance with an embodiment of the present disclosure.

Referring to FIG. 11, there is a block diagram illustrating structures of an exemplary CN node 107 configured to interact with the wireless device 104₂ and the RAN node 102₂ in accordance with an embodiment of the present disclosure. In an embodiment, the CN node 107 may comprise a receive module 1102, a store module 1104, and a transmit module 1106. The receive module 1102 is configured to receive the RCC values for both the uplink and downlink from either or both of the wireless device 104₂ and the RAN node 102₂ after the termination of the connection between the wireless device 104₂ and the RAN node 102₂ (see FIG. 4's steps 8 and 10). The store module 1104 is configured to store the downlink RCC value and the uplink RCC value associated with the one wireless device. The transmit module 1104 is configured to transmit to the RAN node 102₂ the paging message 208 with the RCC values for uplink and downlink for the wireless device 104₂ when a downlink payload becomes available for the wireless device 104₂ (see FIG. 5's step 1). The RCC values for both uplink and downlink may be sent together in the paging message 208 with a time stamp indicating the time that the RCC values had been uploaded to the CN node 102₂ and cell identifier information about the cell where the wireless device 104₂ was connected when these RCC values were obtained. This information and if desired additional information may also be provided in the paging message 208 to enable the RAN node 102₂ to assess the reliability of the downlink and uplink RCC values.

As those skilled in the art will appreciate, the above-described modules 1102, 1104 and 1106 of the CN node 107 may be implemented separately as suitable dedicated circuits. Further, the modules 1102, 1104 and 1106 can also be implemented using any number of dedicated circuits through functional combination or separation. In some embodiments, the modules 1102, 1104 and 1106 may be even combined in a single application specific integrated circuit (ASIC). As an alternative software-based implementation, the CN node may comprise a memory 148, a processor 146 (including but not limited to a microprocessor, a microcontroller or a Digital Signal Processor (DSP), etc.) and a transceiver 136. The memory 148 stores machine-readable program code executable by the processor 146 to cause the CN node 107 to perform the steps of the above-described method 1000.

EC-GSM Dynamic Coverage Class Update

Figure 14:
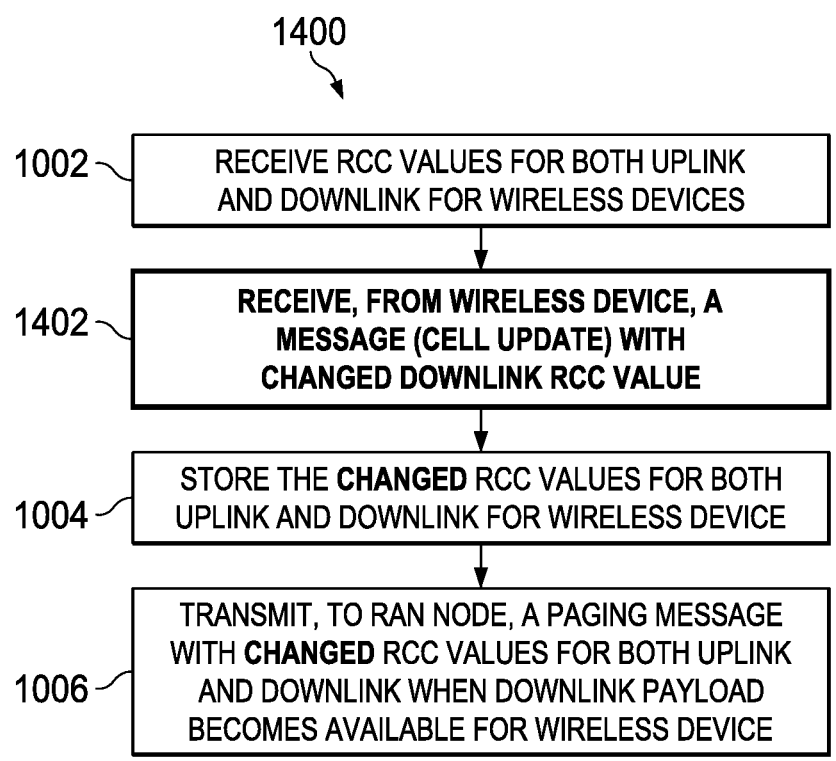
FIG. 14 is a flowchart illustrating an additional step in the method implemented in the CN node shown in FIG. 10 in accordance with another embodiment of the present disclosure.
Figure 13:
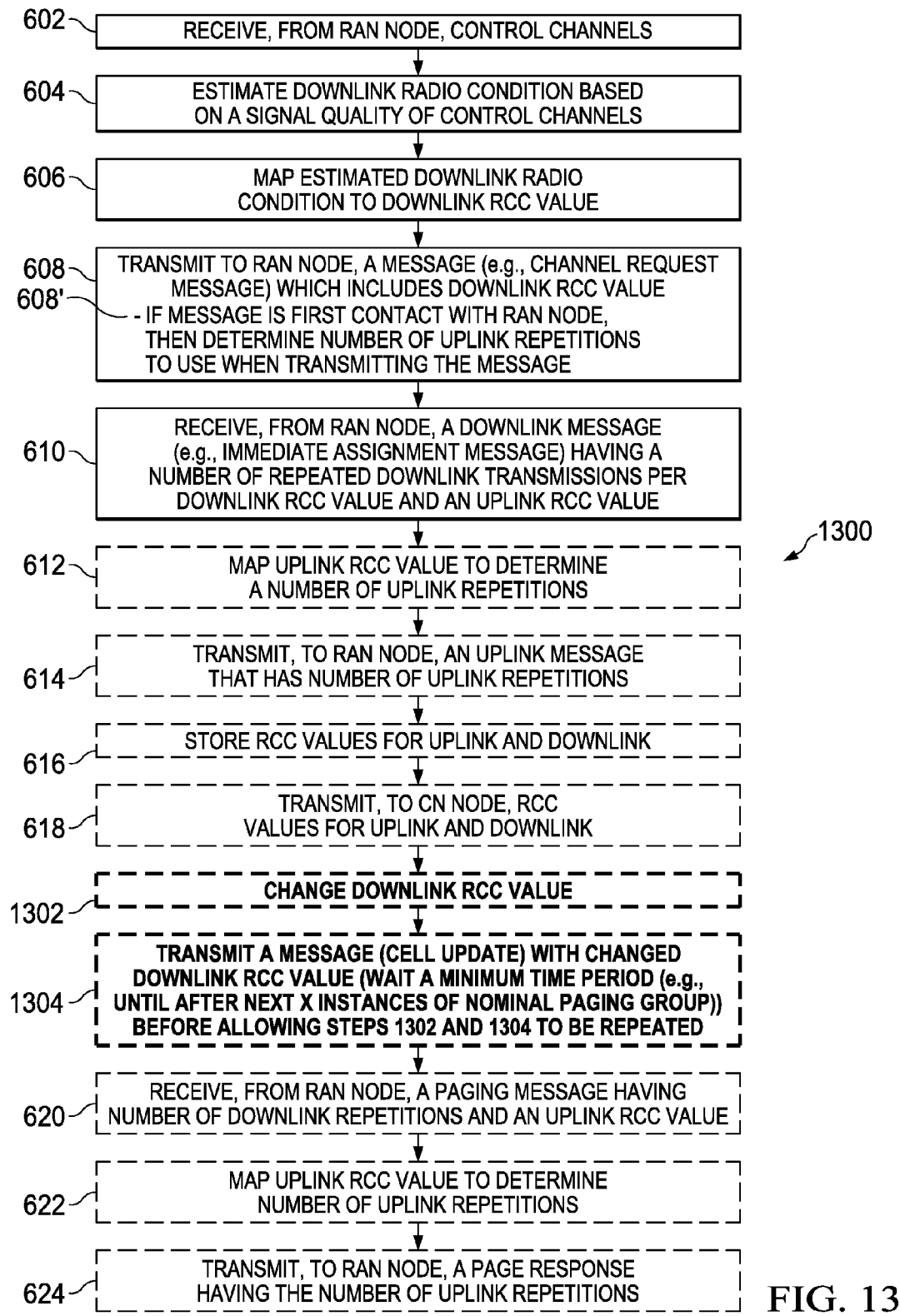
FIG. 13 is a flowchart illustrating additional steps in the method implemented in the wireless device shown in FIG. 6 in accordance with another embodiment of the present disclosure.

At the aforementioned 3GPP TSG-GERAN Meeting #62, the Work Item Description GP-140421, entitled "New Study Item on Cellular System Support for Ultra Low Complexity and Low Throughput Internet of Things" was approved. One of the main objectives of this work item was to increase the coverage when compared to existing GPRS services. The following description outlines a procedure that ensures that the CN node 107 (e.g., SGSN 107) always sends a paging message 208 to the RAN node 102₂ (e.g., BSS 102₂) indicating a downlink coverage class sufficient (equal to or higher than estimated by the wireless device 104₂) for the RAN node 102₂ to be able to successfully page the wireless device 104₂. In particular, FIGS. 12-14 illustrate the steps performed by the wireless device 104₂, the RAN node 102₂ and the CN node 107 to implement this new procedure (note: FIGS. 12, 13 and 14 are the same as FIGS. 4, 6 and 10 but for the additional steps (see bold text) associated with this new procedure). Even though the discussion below is conducted in the scope of an EC-GSM (GSM operation of packet data channels supporting extended coverage when compared to legacy GSM network operation), the solutions described herein are applicable to other types of wireless communication systems, including, for example, WCDMA, LTE, and WiMAX systems.

1. Determination of Paging Group

When paging an EC-GSM wireless device 104₂, in order to determine the specific set of Extended Coverage Paging Channel (EC-PCH) blocks to use to send the page message 208', the RAN node 102₂ (e.g., BSS 102₂) first needs to know:

the eDRX cycle
the downlink coverage class (DL CC), and,
the IMSI of the wireless device 104₂.

The downlink CC (downlink RCC value) is estimated by the wireless device 104₂ and communicated to the network 100 (CN node 107). Thereafter, the RAN node 102₂ receives the downlink CC (downlink RCC value) from the CN node 107 and uses it to determine the number of paging resources (EC-PCH blocks) that are needed to be sent when sending the paging message 208' to the wireless device 104₂ in order for the network 100 to identify the location of the wireless device 104₂.

Even though the EC-GSM device 104₂ is expected to provide the CN node 107 (e.g., SGSN 107) with its estimated DL CC (downlink RCC value) within, for example, the context of the RAU procedure, there remains the possibility that the wireless device 104₂ will change its estimated DL CC (downlink RCC value) at any time between any two such successive procedures (see FIG. 12's step 11 and FIG. 13's step 1302). This change in DL CC is discussed in more detail below.

2. Methods for Updating DL Coverage Class 2.1 Pre-Paging Group Update of DL CC

Whenever the coverage class of the wireless device 104₂ has deteriorated such that it will not be able to decode the paging message 208' using the DL coverage class (downlink RCC value) last provided to the CN node 107 (e.g., SGSN 107), it is proposed to use a cell update procedure which includes the transmission of only a single RLC data block with the new downlink RCC value and is therefore a power efficient way of triggering a DL CC update in the CN node 107 (e.g., SGSN 107) (see FIG. 12's step 12, FIG. 13's step 1304 and FIG. 14's step 1402).

Furthermore, to reduce the possibility of excessive signaling between the wireless device 104₂ and the CN node 107 (e.g., SGSN 107), the wireless device 104₂ can wait until shortly before (e.g. 5 seconds) the next occurrence of its nominal paging group (i.e., based on its current DL CC) before performing a cell update to convey its new DL CC (downlink RCC value) to the CN node 107 (e.g., SGSN 107) (see FIG. 12's step 12, FIG. 13's step 1304 and FIG. 14's step 1402).

In addition, having the wireless device 104₂ wait until just before the next occurrence of its nominal paging group to finally decide that its DL CC needs to be changed ensures that the cell update will be used as sparingly as possible. This solution is used whenever the wireless device 104₂ changes to a higher coverage class (needing more blind repetitions) in order for the wireless device 104₂ to be able to (to a high degree of probability) read a paging message 208' that may be sent using its nominal paging group. This does not guarantee that the wireless device 104₂ will always be able to read a paging message 208' sent using the nominal paging group indicated by its recently transmitted cell update (e.g., in case the network addresses multiple devices of a lower coverage class during the expected paging group) but will reduce the probability of missing a paging message 208' to the point where secondary paging mechanisms are not seen as being needed.

2.2 Impacts on Signaling

Using the cell change procedure to update the DL coverage class just prior to the nominal paging occurrence will increase the signaling load. In this section, the impacts on signaling are analyzed where it is assumed that each cell update will result in one channel request message and one Immediate Assignment message.

The assumptions, taken from the agreed traffic model discussed in GPC150009 and 3GPP TR 45.820 V0.3.0 (2015-03), Source Vodafone, GERAN Ad Hoc#1 on FS_IoT_LC 7 (the contents of these documents are hereby incorporated herein by reference) are used to estimate the additional signaling load which is summarized in TABLE 1 below. Using the agreed traffic model, the overall arrival rate on the RACH and AGCH can be calculated to be 6.8 access/sec.

TABLE 1 parameters used to calculate impacts on signaling

|  | Value | Number of devices requiring coverage class update (20%) | RACH/AGCH load/day |
|---|---|---|---|
| Number of devices per cell | 52 547 | | |
| Seconds per day | 86400 | | |
| Split of devices for Network Command | 20% | | |
| Percentage of paging occurrences requiring update of DL coverage class | 20% | | |
| Triggering intervals | | | |
| 30 mins | 5% | 104 | 4992 |
| 1 hour | 15% | 312 | 7488 |
| 2 hours | 40% | 832 | 9984 |
| 1 day | 40% | 832 | 832 |
| Total RACH/AGCH load/sec | | | 0.27 |

From TABLE 1, it can be seen that with the assumption that every $5^{th}$ paging occurrence will lead to a wireless device $104_2$ (for example) determining that a cell update is needed, the additional RACH/AGCH load is 0.27 access/sec which is equivalent to an increase of around 4%. This additional signaling load is considered to be acceptable. Also, it should be noted that the assumption that 20% of paging occurrence monitoring events will lead to a wireless device determining that an update of DL coverage class is needed is considered very pessimistic.

2.3 Transaction Time Update of DL CC

Whenever the DL coverage class (downlink RCC value) has improved such that the EC-GSM device $104_2$ will be able to decode the paging message 208' using a smaller number of repetitions, there is in principal no need to update the DL coverage class with the CN node 107 (e.g., SGSN 107) just prior to the paging unless there is a need to save paging bandwidth. In this case, the wireless device $104_2$ can wait until the next uplink transaction to inform the CN node 107 (e.g., SGSN 107) of the new DL CC instead of performing a cell update shortly before its next nominal paging group as described earlier. This is possible because the wireless device $104_2$ can safely continue to use its current DL CC (downlink RCC value) to read paging messages 208' since the wireless device $104_2$ is currently in a better coverage class than what the CN node 107 (e.g., SGSN 107) currently assumes.

The most straightforward way for the wireless device $104_2$ to provide the CN node 107 (e.g., SGSN 107) with the new DL coverage class (downlink RCC value) is to include a new IE in the UL-UNITDATA PDU which transfers a wireless device's LLC-PDU and its associated radio interface information across the Gb-interface. This realization is possible since whenever an EC-GSM device $104_2$ accesses the network 100, it sends a RACH request 202 (e.g., Channel Request message 202) to the RAN node $102_2$ (e.g., BSS $102_2$) including an indication of its estimated DL CC (downlink RCC value) in order for the RAN node $102_2$ (e.g., BSS $102_2$) to be able to properly assign resources as well as send the Immediate Assignment message 204 with the appropriate number of repetitions (see FIG. 12's steps 4 and 7). This means that whenever an EC-GSM wireless device $104_2$ sends uplink data to the RAN node $102_2$ (e.g., BSS $102_2$), it may add the latest coverage class information to the UL-UNITDATA PDU it sends to the CN node 107 (e.g., SGSN 107) (see FIG. 12's step 12, FIG. 13's step 1304 and FIG. 14's step 1402).

3. Conclusions

To ensure that the CN node 107 (e.g., SGSN 107) always sends a paging message 208 to the RAN node $102_2$ (e.g., BSS $102_2$) indicating a downlink coverage class (downlink RCC value) sufficient (equal to or higher than) for the RAN node $102_2$ (e.g., BSS $102_2$) to be able to successfully page the wireless device $104_2$ in extended coverage, adaptations can be made as discussed above to both the Pre-Paging Group Update of the downlink coverage class and the transaction time update downlink solutions.

EC-GSM Adjusting the Estimated Coverage Class

At GERAN#62 a new feasibility study named Cellular System Support for Ultra Low Complexity and Low Throughput Internet of Things (WI code: FS_IoT_LC) was approved. For details associated with this feasibility study, reference is made to GP-140421, "New Study Item on Cellular System Support for Ultra Low Complexity and Low Throughput Internet of Things (FS_IoT_LC) (revision of GP-140418)", source VODAFONE Group Plc. GERAN#62, dated May 26, 2014 (the contents of which are hereby incorporated herein by reference).

At GERAN#65, the GP-150173, "EC-GSM Support of Normal Bursts in Large Cells", source Ericsson, GERAN#62, dated Mar. 9, 2015 (the contents of which are hereby incorporated herein by reference) was presented in which the principles of using Normal Bursts (NBs) and Access Bursts (ABs) were described. The following disclosure supplements GP-150173's discussion by introducing new procedures as to how the wireless device $104_2$ (for example) performs AB based system access requests and/or NB based system access requests depending on whether the received control channels (e.g., SI messages) indicate a small cell or a large cell (see FIGS. 15A-15B which is the same as FIGS. 2, 6 and 8A-8B but for the additional steps/operations (see bold text) associated with this new procedure). Plus, the following disclosure describes a new procedure as to how a wireless device $104_2$ (for example) may adjust its estimated coverage class (downlink RCC class) should it experience an AB based system access failure (see FIG. 16A-16B which is the same as FIGS. 2, 6 and 8A-8B but for the additional steps/operations (see bold text) associated with this new procedure). Although the discussion below is conducted in the scope of an EC-GSM (GSM operation of packet data channels supporting extended coverage when compared to legacy GSM network operation), the procedures described herein are applicable to other types of wireless communication systems, including, for example, WCDMA, LTE, and WiMAX systems.

1. Principles of Operation for Using AB/NB

Figure 15A:
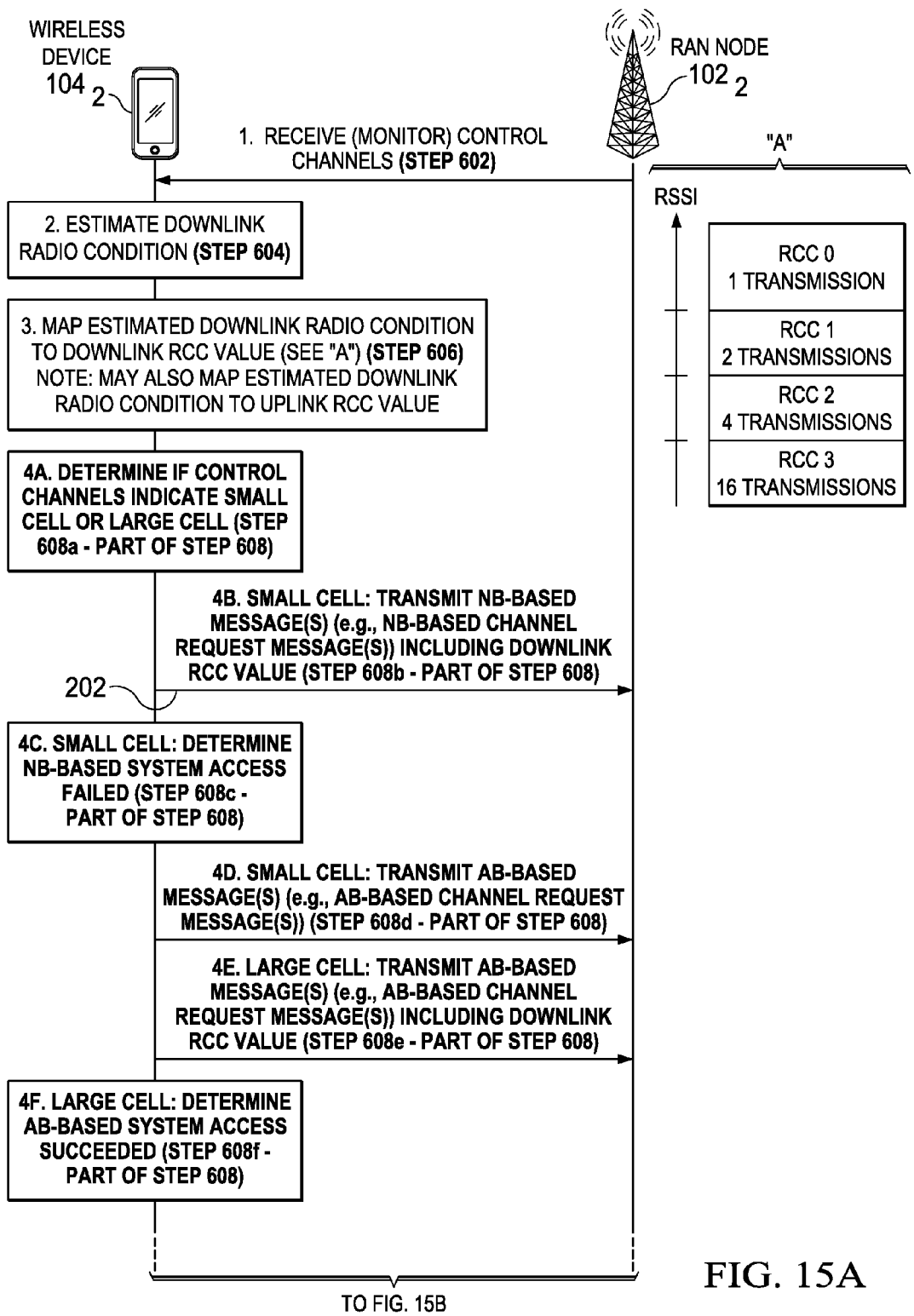
FIGS. 15A-15B is a signal flow diagram illustrating additional steps in the RCC value determination process that occur during the wireless device originated transfer as previously shown in FIGS. 2, 6 and 8A-8B in accordance with another embodiment of the present disclosure.

A cell (e.g., RAN node $102_2$) that supports EC-GSM will support the presence of an EC-GSM CCCH on TS1 of the BCCH carrier and will thereby inform EC-GSM CIoT wireless devices (e.g., wireless device $104_2$) of the availability of EC-GSM service. CIoT wireless devices (e.g., wireless device $104_2$) can then perform system access in an EC-GSM capable cell based on cell size information which is received in a SI message transmitted on the Extended Coverage Broadcast Control Channel (EC-BCCH) as follows:

SI message Indicates Small Cell (FIG. 15A's step 4A):
  Wireless device $104_1$, $104_2$, $104_3$ . . . $104_n$ makes use of NB based system access requests using the RACH on TS0 or Extended Coverage Random Access Channel (EC-RACH) on TS1 (FIG. 15A's step 4B). The NB based system access requests are used when a cell is small (about a 4 km radius or less) or a cell is large for the case where a wireless device $104_2$ (for example) already has applicable timing advance information when attempting system access on the RACH. See also, GP-140365, "Accelerated System Access Procedure", source Ericsson LM, GERAN#62, dated May 26, 2014 and GP-150137, "EC-GSM, CCCH Mapping on TS0 and TS1", source Ericsson LM, GERAN#65, dated Mar. 10, 2015 (the contents of which are hereby incorporated herein by reference).

To guard against the case where a wireless device $104_2$ (for example) outside the target contour of a small cell is still able to lock onto that cell, if the wireless device $104_2$ is unable to successfully perform a NB based system access (after sending the maximum number of allowed EC-RACH retransmissions) (FIG. 15A's step 4C) then the wireless device $104_2$ shall revert back to using AB based system access (see FIG. 15A's step 4D—note the downlink RCC value may be incremented as discussed in the next section) and proceed as described below for the large cell scenario.

Note: Small cell is defined as a cell having a radius of about 4 km or less.

SI Message Indicates Large Cell (see FIG. 15A's step 4A):

Wireless device $104_1$, $104_2$, $104_3$ . . . $104_n$ attempts AB based system access requests using the EC-RACH on TS1 or the RACH on TS0 (FIG. 15A's step 4E). The AB based system access requests are used when cells are large for the case where a wireless device $104_2$ (for example) has no applicable timing advance information when attempting system access on the RACH. See also, GP-150137, "EC-GSM, CCCH Mapping on TS0 and TS1", source Ericsson LM, GERAN#65, dated Mar. 10, 2015 (the contents of which are hereby incorporated herein by reference).

Figure 15B:
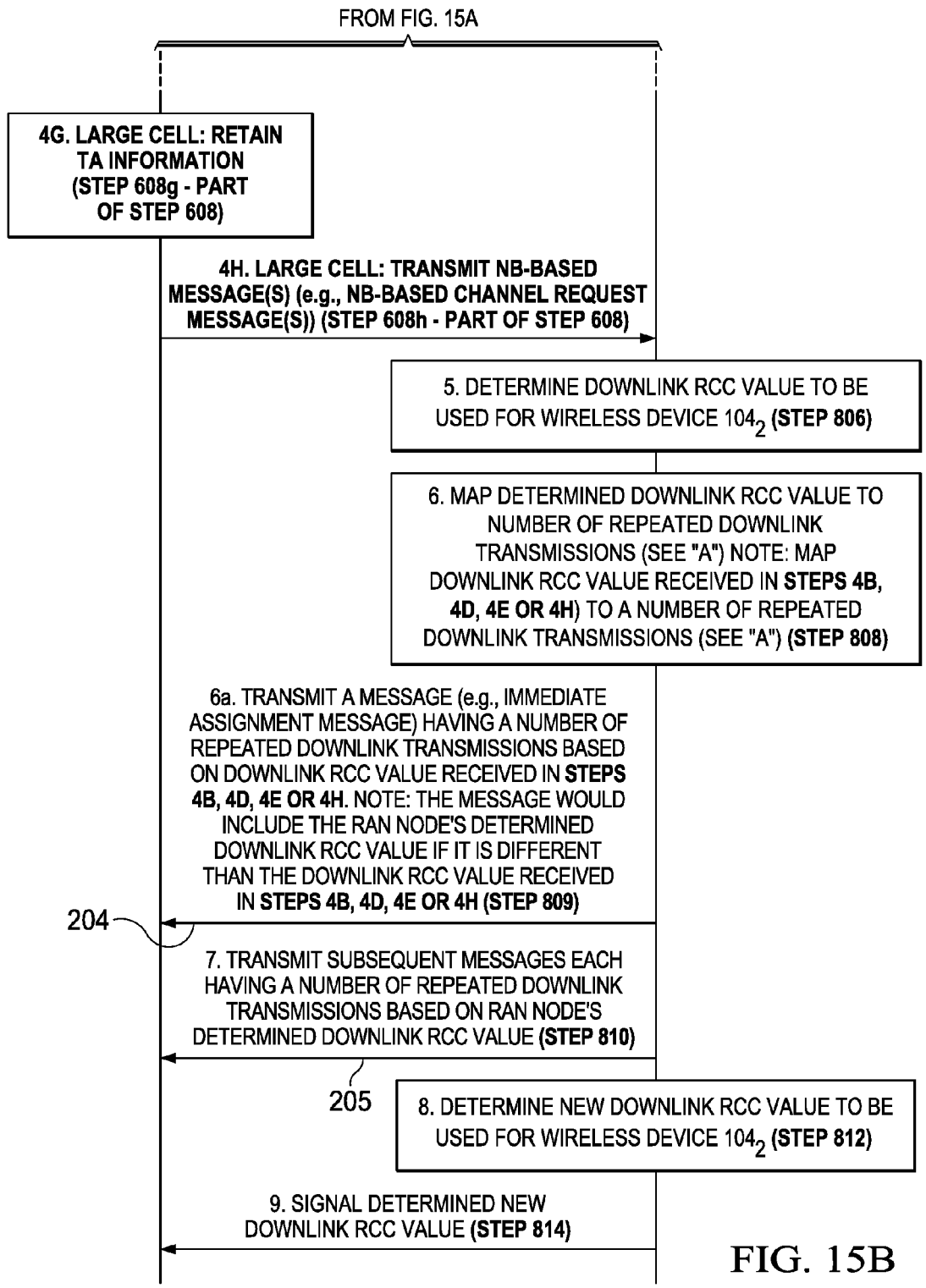

A wireless device $104_2$ (for example) that determines it has low or no mobility and is operating in a large cell (e.g., it is configured as stationary) shall make at least one AB based system access request and successfully complete the corresponding uplink transmission (report) to determine the Timing Advance (TA) to apply when attempting a subsequent NB based system access in its current cell (see FIG. 15A's step 4F and FIG. 15B's 4G and 4H).

Once a wireless device $104_2$ (for example) has acquired the cell specific TA information, it is able to attempt NB based system access requests (see FIG. 15A's step 4H). Stated another way, once the wireless device $104_2$ (for example) has determined it has low or no mobility, it shall retain knowledge of the cell specific TA received in a large cell for future NB based system access attempts in that cell.

A wireless device $104_2$ (for example) that is unable to successfully perform a NB based system access using the most recently received TA information for its serving cell shall revert back to using AB based system access until it successfully completes another uplink transmission.

A wireless device $104_2$ (for example) shall consider a NB based system access to have failed after sending the maximum number of allowed EC-RACH retransmissions, similar to the legacy RACH procedure which makes use of the "max retrans" parameter.

Note: Large cell is defined as a cell having a radius greater than 4 km.

Coverage Class Considerations

A wireless device $104_2$ (for example) that supports EC-GSM may estimate its coverage class (the downlink RCC value and the uplink RCC value) as needed (implementation specific) except while in packet transfer mode or while in a power saving state. The wireless device $104_2$ (for example) uses its estimated coverage class (the downlink RCC value and the uplink RCC value) when attempting either an AB or NB based system access.

If a wireless device $104_2$ (for example) is unable to perform an AB based system access after sending the maximum number of allowed EC-RACH retransmissions (see FIG. 16A's steps 4A and 4B), then the wireless device $104_2$ (for example) may determine that its current estimation of coverage class (downlink RCC value, uplink RCC value, or both the downlink RCC value and the uplink RCC value) is incorrect (i.e., too optimistic—not enough repetitions), or it may decide to trigger the cell re-selection procedure (implementation specific).

Figure 16A:
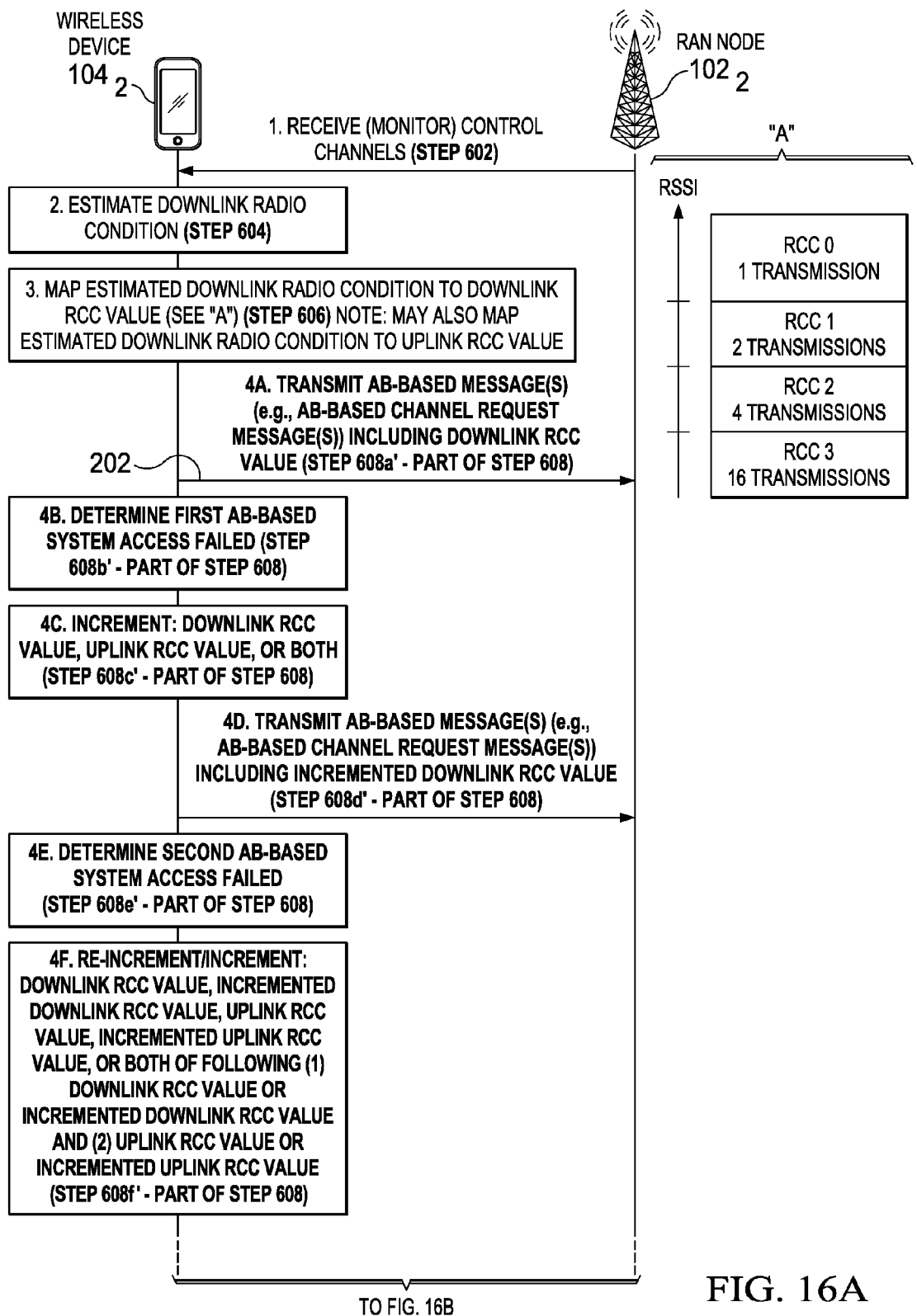
FIGS. 16A-16B is a signal flow diagram illustrating additional steps in the RCC value determination process that occur during the wireless device originated transfer as previously shown in FIGS. 2, 6 and 8A-8B in accordance with yet another embodiment of the present disclosure.
Figure 16B:
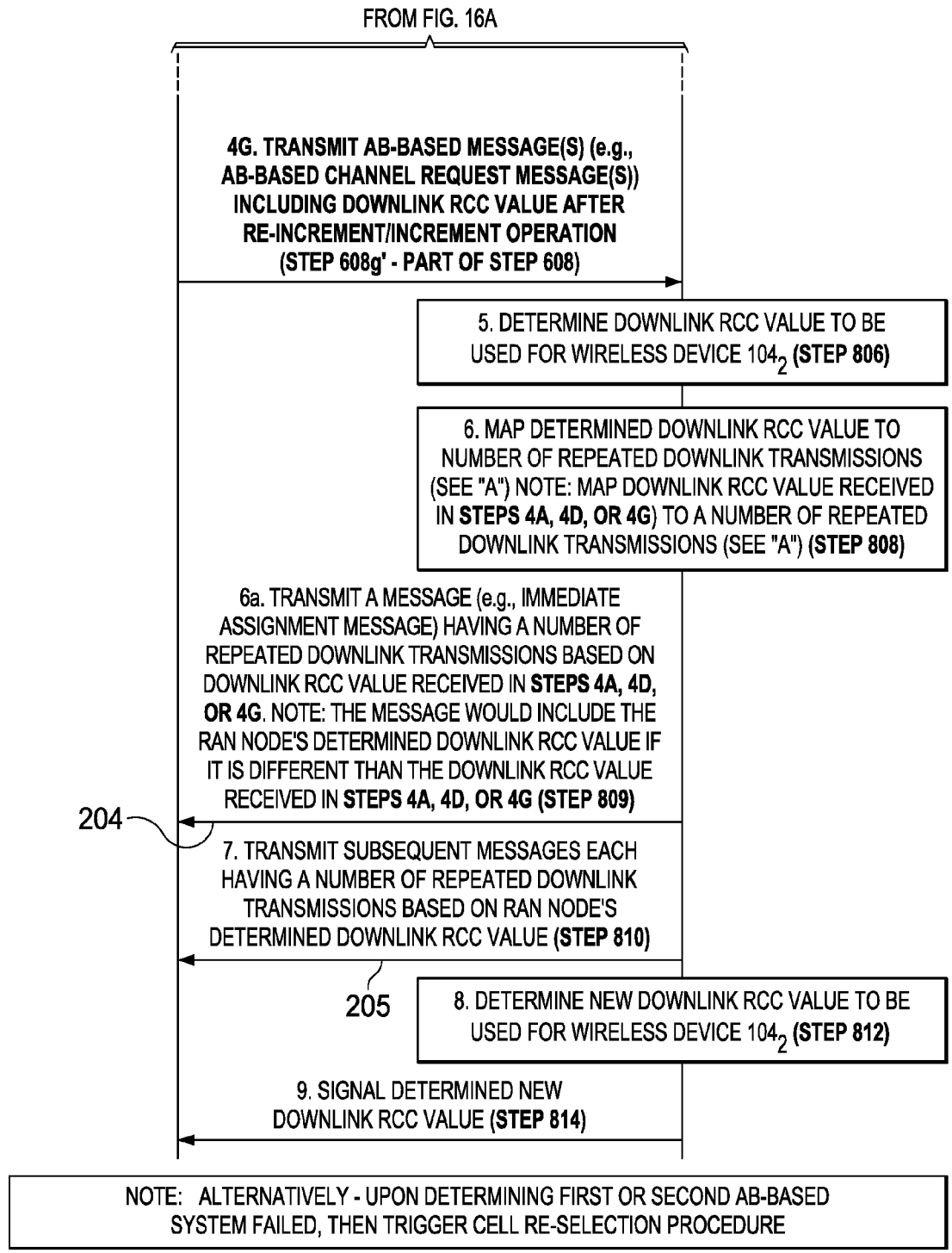

If the wireless device $104_2$ (for example) decides that its currently estimated coverage class (downlink RCC value, uplink RCC value, or both the downlink RCC value and the uplink RCC value) is too optimistic, it shall increment the coverage class (downlink RCC value, uplink RCC value, or both the downlink RCC value and the uplink RCC value) (see FIG. 16A's step 4C) and then attempt another AB based system access (see FIG. 16A's step 4D). If the AB based system access is successful, then the use of NB-based messages by the wireless device $104_2$ (for example) may then also be possible for subsequent system access attempts (see discussion above).

If after incrementing its coverage class (downlink RCC value, uplink RCC value, or both the downlink RCC value and the uplink RCC value) the wireless device $104_2$ (for example) remains unable to perform an AB based system access (after sending the maximum number of allowed EC-RACH retransmissions) (see FIG. 16A's step 4E), then the wireless device $104_2$ (for example) may repeat the process of incrementing its coverage class (downlink RCC value, incremented downlink RCC value, uplink RCC value, incremented uplink RCC value, or both of the following: (1) the downlink RCC value or the incremented downlink RCC value, and (2) the uplink RCC value or the incremented uplink RCC value) (see FIG. 16A's step 4F and FIG. 16B's step 4G), or it may decide to trigger the cell re-selection procedure (implementation specific).

The foregoing describes various procedures on how the wireless device $104_2$ (for example) performs AB based system access requests and/or NB based system access requests depending on whether the received control channels (e.g., SI messages) indicate a small cell or a large cell. Plus, the foregoing describes a procedure for how a wireless device $104_2$ (for example) may adjust its estimated coverage class (the downlink RCC value and the uplink RCC value) should it experience an AB based system access failure.

Extended Coverage for GSM, Realizing Extended Coverage Through Coverage Classes 1.0 Introduction One of the main objectives in the FS_IoT_LC study discussed in GP-140241 "Cellular System Support for Ultra Low Complexity and Low Throughput Internet of Things", GERAN#64, source VODAFONE Group Plc., dated May 26, 2014 (the contents of which are hereby incorporated herein by reference) is to extend coverage. For the Extended Coverage associated with the GSM concept (EC-GSM), earlier referred to as GSM Evolution, the concept of Coverage Classes (CC) is fundamental to realize extended radio coverage through blind repetitions. In short, each CC will in an incremental fashion provide increasing radio coverage up to 20 dB beyond the coverage associated with the legacy GPRS. The following discussion provides an overview of the concept of CCs and introduces a new procedure for estimation of DL and UL CCs (see FIG. 21 which is the same as FIGS. 2, 6 and 8A-8B but for the additional steps/operations (see bold text) associated with this new procedure). Although the discussion below is conducted in the scope of an EC-GSM (GSM operation of packet data channels supporting extended coverage when compared to legacy GSM network operation), the procedures described herein are applicable to other types of wireless communication systems, including, for example, WCDMA, LTE, and WiMAX systems.

2.0 Coverage Classes

Figure 17:
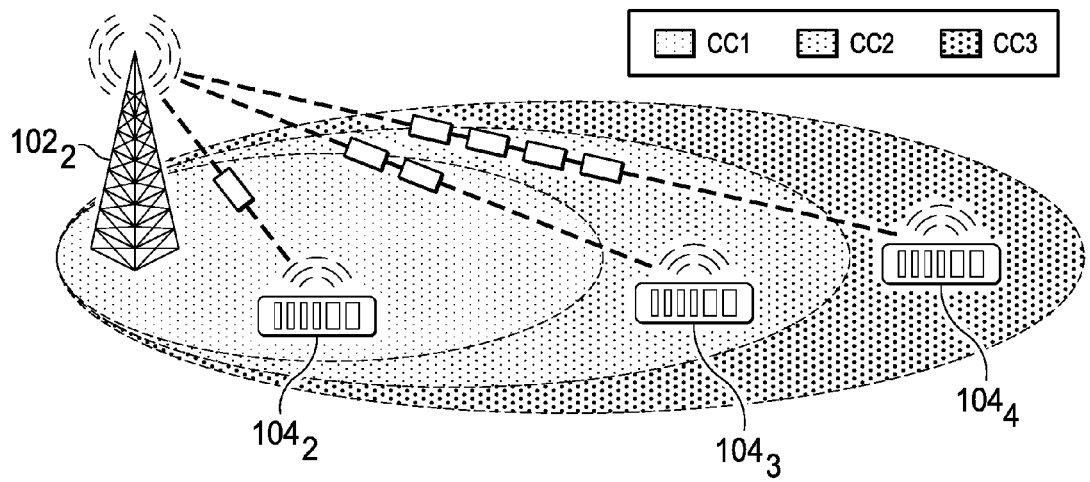
FIG. 17 is a diagram illustrating an exemplary coupling between CC and a number of blind transmissions between a RAN node and three wireless devices which is used to explain a new procedure in accordance with still yet another embodiment of the present disclosure.

In EC-GSM, coverage extension is provided by means of blind repetitions, and in the case of the proposed control channels EC-CCCH/D, EC-PACCH/D and EC-PACCH/U for the EC-GSM concept, coverage extension is also provided through more robust encoding of these control channels (see (1) GPC150060, "EC-GSM, EC-PCH and EC-AGCH block format, GERAN1 Adhoc#1 on FS_IoT_LC, source Ericsson, dated Feb. 2, 2015 (the contents of which are hereby incorporated herein by reference) and (2) GPC150059, "EC-GSM, EC-PACCH block format, GERAN1 Adhoc#1 on FS_IoT_LC, source Ericsson, dated Feb. 2, 2015 (the contents of which are hereby incorporated herein by reference)). It should be noted that all EC-GSM logical channels have been given an EC-prefix to distinguish them from the legacy GSM channels. It was shown in GP-140882, "GSM Evolution for cellular IoT—On using blind repetitions", GERAN#64, source Ericsson, dated Nov. 17, 2014 (the contents of which are hereby incorporated herein by reference) that a doubling of the number of blind transmissions will improve coverage by roughly 3 dB. This suggests a tight coupling between the CC definition and the number of blind transmissions used to provide certain coverage. In FIG. 17 an example of this coupling is illustrated using three levels of CCs with different number of blind transmissions for each CC. In this example, the RAN node 102$_2$ is utilizing a CC1 (1 transmission), a CC2 (2 repeated transmissions), and a CC3 (four repeated transmissions) to communicate with wireless devices 104$_2$, 104$_3$ and 104$_4$, respectively.

Beyond the number of blind transmissions, the CC chosen will be dependent on a number of factors such as the wireless device's output power and receiver performance as well as the RAN node's output power and performance. The CC chosen will also be dependent on the logical channel, as exemplified in TABLE 2 where the maximum number of needed transmissions, expressed in blind and HARQ transmissions, are listed for each logical EC-channel. It has also been concluded that the UL is the limiting link for legacy GPRS and, with this in mind, it is e.g., clear that different number of repetitions may be needed in UL and DL, and hence different CCs may be applicable in UL and DL for a given device (for a discussion about the legacy GPRS performance, see GP-140241, "Cellular System Support for Ultra Low Complexity and Low Throughput Internet of Things", GERAN#64, source VODAFONE Group Plc., dated May 26, 2014 (the contents of which are hereby incorporated herein by reference)).

TABLE 2

Number of transmissions needed to reach 20 dB coverage improvement beyond legacy GPRS performance

| Logical Channel | Coverage improvement [dB] | Number of blind and HARQ transmissions |
|---|---|---|
| EC-SCH | 20 | 14 blind transmissions |
| EC-BCCH | 20 | 16 blind transmissions |
| EC-RACH (EC-CCCH/U) | 20 | 32 blind transmissions |
| EC-PCH/ EC-AGCH (EC-CCCH/D) | 20 | 32 blind transmissions |
| EC-PACCH/D/U | 20 | 16 blind transmissions |
| EC-PDTCH/U | 20 | 16 blind transmissions, 4 HARQ transmissions |
| EC-PDTCH/D | 20 | 16 blind transmissions, 4 HARQ transmissions |

TABLE 2 lists the number of blind transmissions for each logical channel in the context of the highest CC reaching 20 dB beyond legacy GPRS performance, while the lowest CC (i.e., CC1 as discussed below) typically corresponds to normal coverage and a single transmission. The total number of coverage classes needed in EC-GSM is still to be determined, and one important factor when making this decision will be how accurate a wireless device 104$_2$ (for example) can estimate its UL and DL CCs. In the following section, a possible methodology for the wireless device 104$_2$ (for example) to establish the UL and DL CCs is outlined using an example total of six CCs.

3. Estimation of Coverage Class

Figure 21:
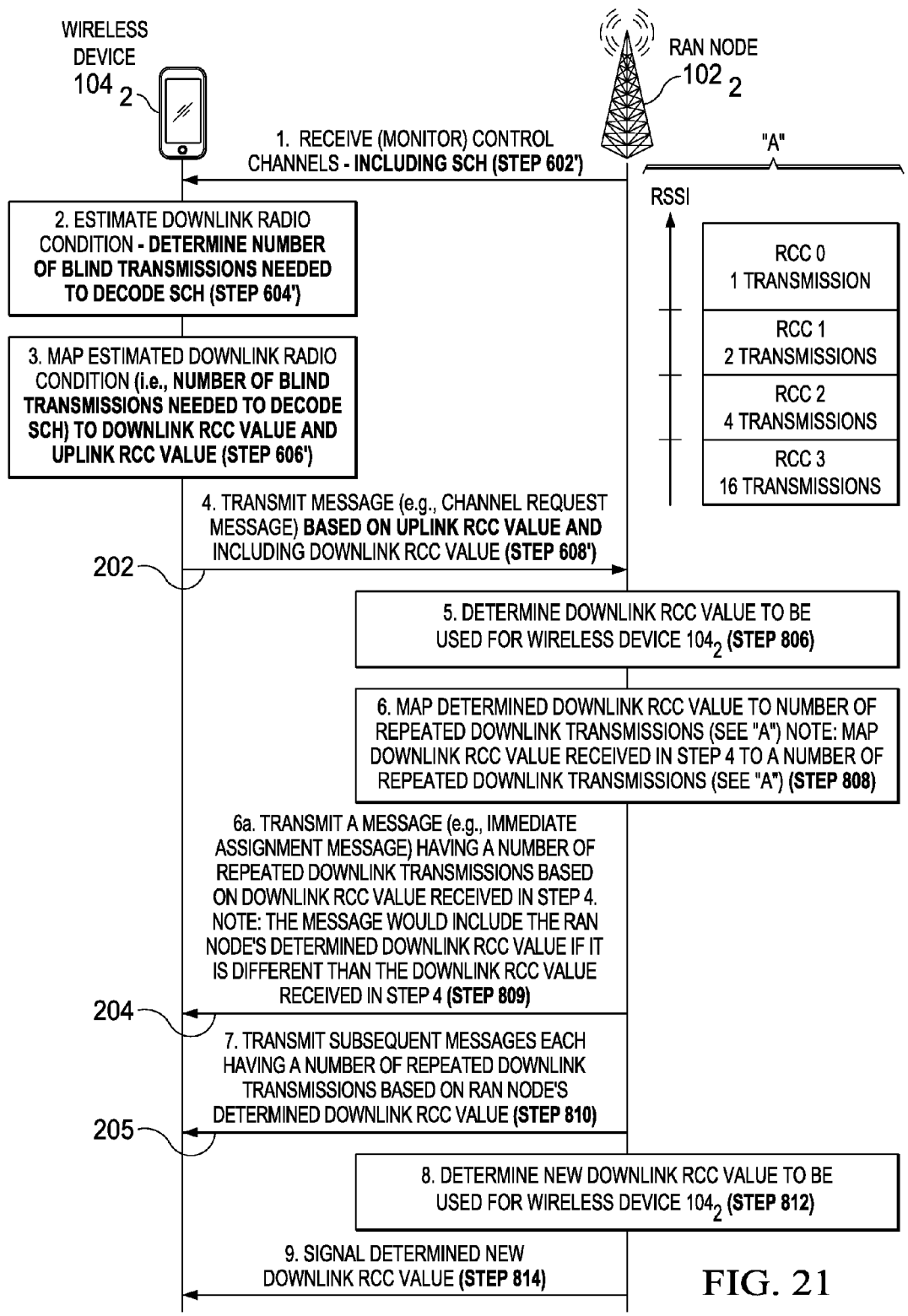

When an EC-GSM wireless device 104$_2$ (for example) wakes up, it first attempts to synchronize to a cell via the FCCH and EC-SCH, and reads the EC-BCCH e.g., in case the EC-SCH signals an update of the system information via the BCCH_CHANGE flag before it continues to e.g., register with the network via the EC-RACH (see FIG. 21's step 1). For a discussion about the synchronization process, reference is made to (1) GPC150066, "EC-GSM, FCCH overview", GERAN1 Adhoc#1 on FS_IoT_LC, source Ericsson, dated Feb. 2, 2015 (the contents of which are hereby incorporated herein by reference), and (2) GPC150064, "EC-GSM, SCH design, performance and mapping", GERAN1 Adhoc#1 on FS_IoT_LC, source Ericsson, dated Feb. 2, 2015 (the contents of which are hereby incorporated herein by reference).

In order not to waste radio resources, the wireless device 104$_2$ (for example) should estimate its UL CC before accessing the network (e.g., RAN node 102$_2$). The EC-RACH is also intended to convey information from the wireless device 104$_2$ on the UL and DL CCs to be used by the RAN node 102$_2$ (e.g., BSS 102$_2$) when e.g., deciding the number of blind transmissions needed to convey the EC-PCH and EC-AGCH (see GPC150074, "EC-GSM, Random Access Procedure, GERAN2 Adhoc#1 on FS_IoT_LC, source Ericsson, dated Feb. 2, 2015 (the contents of which are hereby incorporated herein by reference).

There are various means that the wireless device 104$_2$ can use to estimate the UL and DL CCs during the synchronization procedure. In the following discussion, the feasibility of doing so is illustrated by a procedure where the number of blind transmissions needed for the wireless device 104$_2$ (for example) to decode the EC-SCH is used to assess the UL and DL CCs (see FIG. 21's steps 2 and 3—note step 4 is where the wireless device 104₂ transmits the access request with a number of repetitions based on the determined UL CC value and where the access request includes the determined DL CC value).

Figure 18:
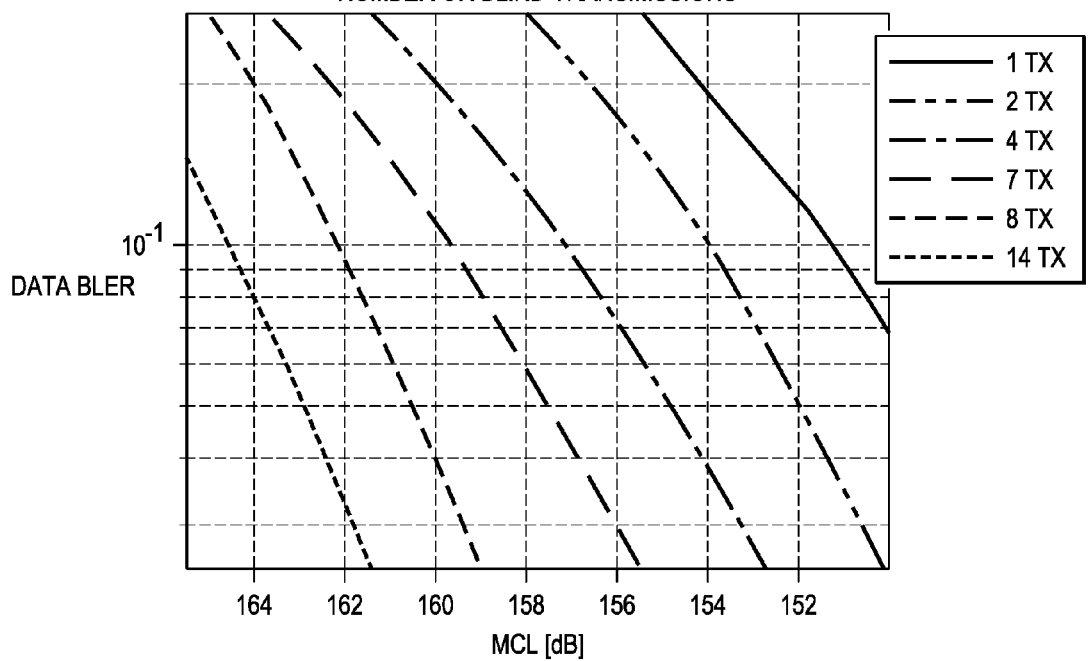
FIG. 18 is a graph illustrating an exemplary Extended Coverage Synchronization Channel (EC-SCH) performance for different numbers of blind transmissions which is used to explain the new procedure in accordance with the still yet another embodiment of the present disclosure.

FIG. 18 illustrates the EC-SCH performance for different numbers of blind transmissions, when following the simulation assumptions agreed in GP-140241, "Cellular System Support for Ultra Low Complexity and Low Throughput Internet of Things", GERAN#64, source VODAFONE Group Plc., dated May 26, 2014 (the contents of which are hereby incorporated herein by reference), and the frame mapping introduced in GPC150055, "EC-GSM, Mapping of Logical Channels to Physical Channels, GERAN1 Adhoc#1 on FS_IoT_LC, source Ericsson, dated Feb. 2, 2015 (the contents of which are hereby incorporated herein by reference). As shown, seven or less blind transmissions are mapped onto a single 51-multiframe, while eight or more blind transmissions are mapped over two 51-multiframes. The significant performance difference between seven and eight blind transmissions are explained by the time diversity gained when spreading the transmissions over two 51-multiframes. In the following, the Maximum Coupling Loss (MCL) is defined as follows;

$$MCL = P_{out} - \left(N_0 + NF + \frac{B_z}{N_0}\right) dB$$

Where the output power $P_{OUT}$ and the noise figure NF follow the assumptions in the aforementioned GP-140241, unless otherwise explicitly stated.

Figure 19:
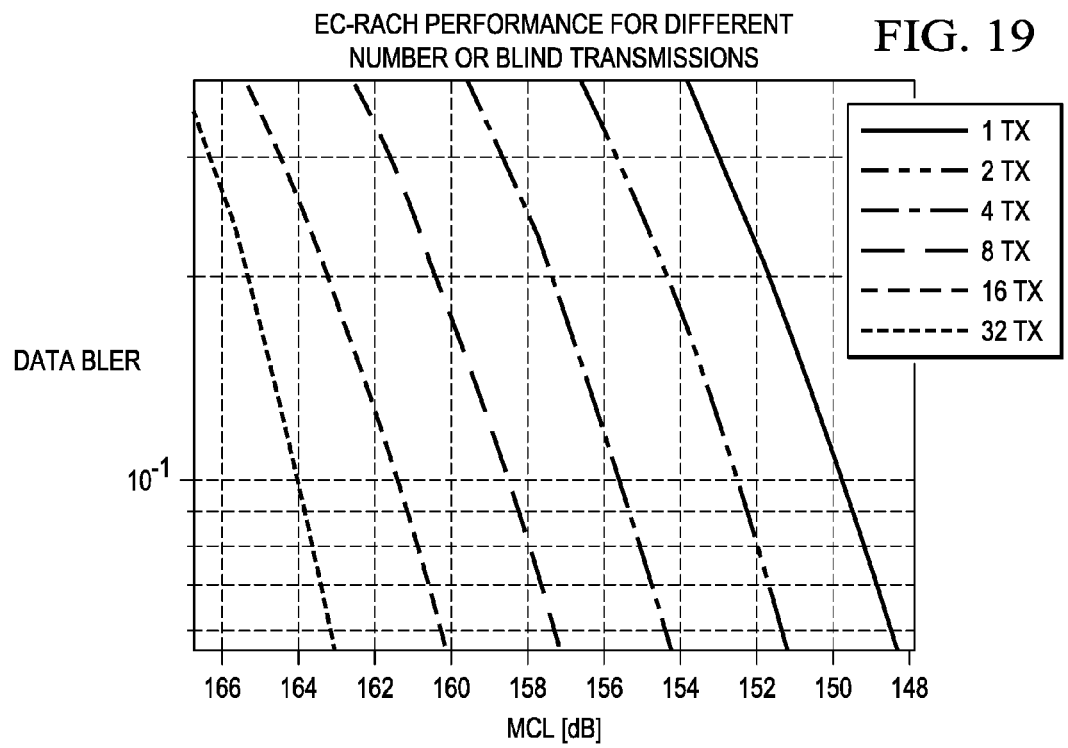
FIG. 19 is a graph illustrating an exemplary Extended Coverage Random Access Channel (EC-RACH) performance for different numbers of blind transmissions which is used to explain the new procedure in accordance with the still yet another embodiment of the present disclosure.

To associate an UL CC to DL EC-SCH performance, in a first step the estimated number of blind transmissions needed on the DL EC-SCH is compared to the number of EC-RACH blind transmissions needed to achieve extended coverage in the UL. FIG. 19 depicts EC-RACH performance for one to 32 blind transmissions following the simulation assumptions agreed in the aforementioned GP-140241, and the frame mapping introduced in the aforementioned GPC150055.

Figure 20:
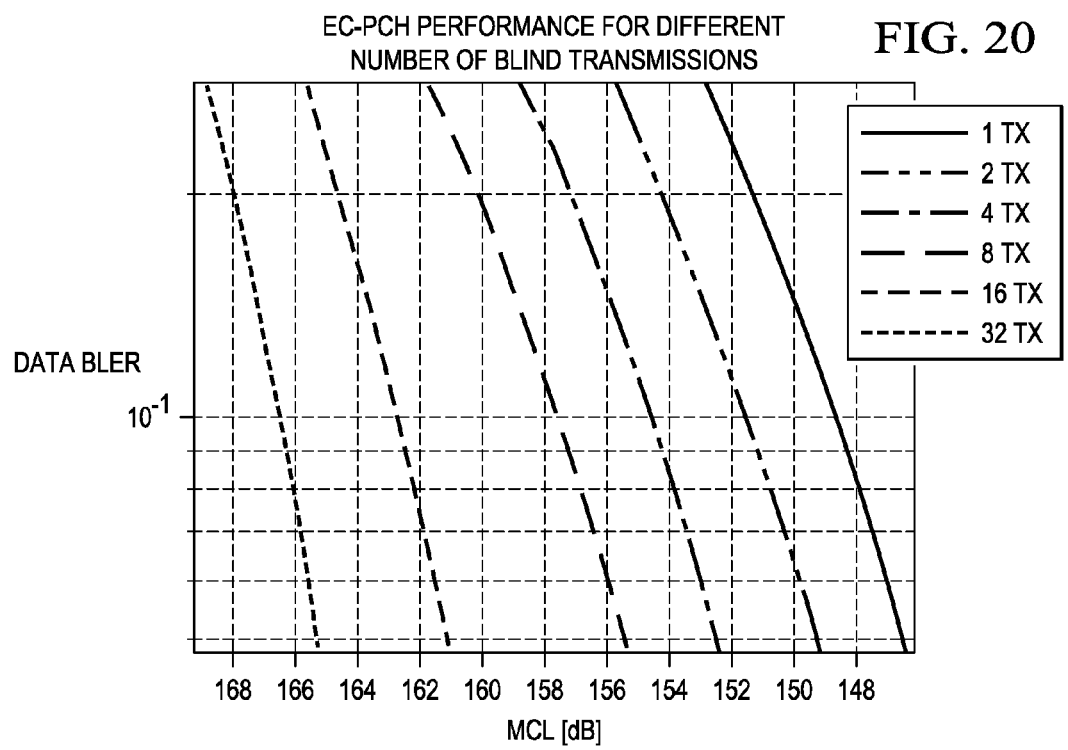
FIG. 20 is a graph illustrating an exemplary Extended Coverage Paging Channel (EC-PCH) performance for different numbers of blind transmissions which is used to explain the new procedure in accordance with the still yet another embodiment of the present disclosure; and, FIG. 21 is a signal flow diagram illustrating additional steps in the RCC value determination process that occur during the wireless device originated transfer as previously shown in FIGS. 2, 6 and 8A-8B in accordance with the still yet another embodiment of the present disclosure.

To derive a DL CC, the EC-PCH performance should also be considered. FIG. 20 depicts EC-PCH performance for one to 32 blind transmissions, again following the simulation assumptions agreed upon in the aforementioned GP-140241, and the frame mapping introduced in the aforementioned GPC150055.

Based on the performance in FIGS. 18-20, TABLE 3 can be constructed where the performances of the EC-SCH, EC-RACH and EC-PCH are listed at the 10% BLER cross over point for each number of blind transmissions. In essence, the rows of TABLE 3 attempt to group EC-SCH, EC-PCH and EC-RACH performance so that the performance spread at 10% BLER between the channels is minimized, while maintaining the prerequisite that the EC-SCH MCL does not exceed the EC-PCH and EC-RACH MCL.

TABLE 3

Exemplified coverage class mapping table at RAN node power 43 dBm and device power 33 dBm.

| DL | EC-SCH | | EC-PCH | | UL | EC-RACH | |
|---|---|---|---|---|---|---|---|
| CC | #TX | CL | #TX | CL | CC | #TX | CL |
| 1 | | | 1 | 148.5 | 1 | 1 | 150 |
| 2 | 1 | 151.5 | 2 | 151.5 | 2 | 2 | 152.5 |
| 3 | 2 | 154 | 4 | 154.5 | 3 | 4 | 155.5 |
| 4 | 4 | 157 | 8 | 157.5 | 4 | 8 | 158.5 |

TABLE 3-continued

Exemplified coverage class mapping table at RAN node power 43 dBm and device power 33 dBm.

| DL | EC-SCH | | EC-PCH | | UL | EC-RACH | |
|---|---|---|---|---|---|---|---|
| CC | #TX | CL | #TX | CL | CC | #TX | CL |
| 5 | 7 | 160 | 16 | 163 | 5 | 16 | 161.5 |
| 5 | 8 | 162 | 16 | 163 | 6 | 32 | 164 |
| 6 | 14 | 164.5 | 32 | 166.5 | 6 | 32[(1)] | 165.5 |

[(1)]EC-RACH reaches 165.5 dB MCL at 15% BLER.

A wireless device 104₂ (for example) may use TABLE 3 as a lookup table with the number of blind transmissions needed to decode the EC-SCH as input, to identify the DL and UL CC, or the number of blind transmissions needed on the EC-PCH and EC-RACH, respectively. To exemplify, if a wireless device 104₂ (for example) needs four blind transmissions on the EC-SCH to synchronize to a cell, it can expect eight blind transmissions when being paged via the EC-PCH, or use eight blind transmissions when accessing the network (e.g., RAN node 102₂) over the EC-RACH.

It can be observed that the entry of seven blind transmissions on the EC-SCH provides added granularity in the assessment of the UL CC, while this is not the case for the DL where 16 EC-PCH blind transmissions maps to seven as well as eight blind transmissions on the EC-SCH.

One can also conclude that TABLE 3 provides a coarse estimate of the CC. It is for example not possible to determine that a wireless device 104₂ (for example) is within normal coverage, and UL and DL CC1, based only on the fact the cell synchronization is achievable over a single EC-SCH transmission. This is no surprise as already today the SCH is more robust than the PCH and RACH, but exemplifies why further investigations are needed on how the described method can be fine-tuned.

When constructing TABLE 3, a wireless device output power of 33 dBm and RAN node output power of 43 dBm was assumed. If these assumptions change, then the relations of TABLE 3 will also change. To exemplify this TABLE 4 depicts a situation where the RAN node power is lowered 3 dB to 40 dBm while the wireless device power remains at 33 dBm, resulting in a shift of the relations between the UL and DL CCs. In order for a wireless device to take the RAN node power into account, it is necessary that this information is conveyed in the SI as proposed in GP-140603, "GSM Evolution for cellular IoT—BCCH overview", GERAN#63, source Ericsson, dated Aug. 25, 2014 (the contents of which are hereby incorporated herein by reference).

TABLE 4

Exemplified coverage class mapping table at RAN node power 40 dBm and device power 33 dBm.

| DL | EC-SCH | | EC-PCH | | UL | EC-RACH | |
|---|---|---|---|---|---|---|---|
| CC | #TX | CL | #TX | CL | CC | #TX | CL |
| 1 | | | 1 | 145.5 | 1 | 1 | 147 |
| 2 | 1 | 148.5 | 2 | 148.5 | 1 | 1 | 149.5 |
| 3 | 2 | 151 | 4 | 151.5 | 2 | 2 | 152.5 |
| 4 | 4 | 154 | 8 | 154.5 | 3 | 4 | 155.5 |
| 5 | 7 | 157 | 16 | 160 | 4 | 8 | 158.5 |
| 5 | 8 | 159 | 16 | 160 | 5 | 16 | 161 |
| 6 | 14 | 161.5 | 32 | 163.5 | 6 | 32 | 164 |

It can finally be noted that in order to provide a complete CC estimate, the above TABLES 3-4 need to be expanded to cover all UL and DL EC channels listed in TABLE 2.

4. Conclusion

The foregoing discussion provides insight on the concept of coverage classes for EC-GSM, and exemplifies how a wireless device $104_2$ (for example) may estimate its DL CC based on the EC-SCH reading, and map this estimate onto a UL CC using its own and the RAN node output power as input.

In view of the foregoing, this disclosure provides a new mechanism for enhancing the radio coverage based on the exchange of uplink and downlink radio condition information, referred to as Radio Coverage Category (RCC), between the wireless device $104_2$ (for example) and the network 100 for use in data transmission (e.g., control plane related signaling or user plane related payload transmission). The disclosed techniques are based on an exchange of estimated RCC values between the network 100 and the wireless device $104_2$ that are used to apply a number (e.g., a pre-defined number) of repeated transmissions on the radio interface. The RCC value may be estimated for the downlink (e.g., from the wireless device $104_2$ perspective) and for the uplink (e.g., from the network 100 perspective). The RCC values may be stored in the relevant network nodes $102_2$ and 107 (for example) and in the wireless device $104_2$ for use in determining the appropriate number of repeated transmissions for subsequent data transmissions, for example, at paging occasions. Some of the aspects of this disclosure that have been described herein include:

- An initial deployment and power on scenario wherein a wireless device $104_2$ (for example) uses its evaluation of downlink radio conditions or pre-configured information to determine the number of repeated transmissions the wireless device $104_2$ should use when sending its very first Channel Request message 202 on the RACH.
- The use of a Channel Request message 202 (RRC Connection Request or any control plane or user plane message transmission on the uplink) to indicate an RCC value that the wireless device $104_2$ has determined to be applicable for subsequent message transmissions to that wireless device $104_2$ (e.g., AGCH or PDTCH). The RCC value used by the RAN node $102_2$ (for example) for downlink transmissions on the PDTCH may be the RCC value last received from the wireless device $104_2$, an estimated RCC value (e.g., based on uplink radio conditions), or a running average of received and/or estimated RCC values. The RCC value used by the RAN node $102_2$ for sending an AGCH message that serves as a response to a Channel Request message 202 must be that indicated by the Channel Request message 202 (however, the content of the AGCH message sent in response to the Channel Request message 202 can indicate a RCC value that is to be used for downlink transmissions on the assigned PDTCH resources that is different from that used to send the AGCH message that serves as a response to a Channel Request message 202). The particular algorithm used for determining the used downlink RCC value may be implementation dependent. The downlink RCC value may represent different numbers of repetitions depending on the logical channel or Radio Bearer used.
- The use of an Assignment message 204 or any control plane or user plane message transmission on the downlink sent to a given wireless device $104_2$ (for example) to indicate an RCC value that the RAN node $102_2$ (for example) has determined to be applicable for subsequent uplink message transmissions (e.g., RACH or PDTCH) made by that wireless device $104_2$. This RCC value may represent different numbers of repetitions depending on the logical channel used. The RCC value used for determining the number of repeated transmissions on the uplink may be based on the latest estimated uplink RCC value received from the network 100, the wireless device's estimates of the uplink RCC value (e.g., based on downlink radio quality), or a running average of received and/or wireless device's estimated uplink RCC values.

The techniques disclosed herein have many advantages some of which are as follows:

- Allows for a reduction in the amount of data transmission between the RAN node and the wireless device.
- Reduces the wireless device's energy consumption and therefore improves the battery lifetime.
- Improves the reliability of the data delivery.
- Reduces the interference level in the network.
- Increases system capacity.
- Since many of the wireless devices used for MTC are expected to be stationary, the disclosed techniques of RCC value estimation and communication between wireless devices and the network may be effective in ensuring efficient utilization of radio resources while still allowing for the possibility of modifying the applicable RCC values, if this ever becomes needed.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A wireless device configured to communicate with a Radio Access Network (RAN) node and a Core Network (CN) node, the wireless device comprising:
a processor; and,
a memory that stores processor-executable instructions, wherein the processor interfaces with the memory to execute the processor-executable instructions, whereby the wireless device is operable to:
receive, from the RAN node, control channels;
estimate a downlink radio condition based on a signal quality of the received control channels;
map the estimated downlink radio condition to one of a plurality of downlink Radio Coverage Category (RCC) values;
transmit, to the RAN node, one or more access burst (AB) based first messages per an uplink RCC value, wherein each of the one or more AB based first messages includes the one downlink RCC value;
determine that a first AB based system access failed after transmitting the one or more AB based first messages; and
upon the determination that the first AB based system access failed:
increment the one downlink RCC value, the uplink RCC value, or both the one downlink RCC value and the uplink RCC value; and
transmit, to the RAN node, one or more access burst (AB) based second messages per the uplink RCC value, if not incremented, or the incremented uplink RCC value, if incremented, wherein each of the one or more AB based second messages includes the one downlink RCC value, if not incremented, or the incremented one downlink RCC value, if incremented.

2. The wireless device of claim 1, wherein the wireless device is further operable to:
determine that a second AB based system access failed after transmitting the one or more AB based second messages; and
upon the determination that the second AB based system access failed:
re-increment/increment the one downlink RCC value, the incremented one downlink RCC value, the uplink RCC value, the incremented uplink RCC value, or both of the following: (1) the one downlink RCC value or the incremented one downlink RCC value, and (2) the uplink RCC value or the incremented uplink RCC value; and
transmit, to the RAN node, one or more access burst (AB) based third messages per the uplink RCC value after the re-increment/increment operation, wherein each of the one or more AB based third messages includes the downlink RCC value after the re-increment/increment operation; or
trigger a cell re-selection procedure.

3. The wireless device of claim 1, wherein the wireless device is further operable to:
determine that a second AB based system access succeeded after transmitting the one or more AB based second messages; and
upon the determination that the second AB based system access succeeded, use Normal Burst (NB) based messages in subsequent system access attempts.

4. The wireless device of claim 3, wherein the wireless device is further operable to:
receive, from the RAN node, a first message having a number of repeated downlink transmissions based on (1) the one downlink RCC value when the first AB based system access succeeded, or (2) either the one downlink RCC, if not incremented, or the incremented one downlink RCC value when the second AB based system access succeeded.

5. The wireless device of claim 4, wherein:
the first message includes another uplink RCC value, and the wireless device is further operable to:
map the another uplink RCC value to a number of repeated uplink transmissions; and
transmit, to the RAN node, one or more second messages repeated according to the number of repeated uplink transmissions.

6. The wireless device of claim 5, wherein the first message further includes a new downlink RCC value.

7. The wireless device of claim 1, wherein the wireless device is further operable to transmit, to the CN node, an updated downlink RCC value in a cell update, wherein the updated downlink RCC value is estimated at a predetermined time prior to a next occurrence of a paging group.

8. The wireless device of claim 1, wherein the wireless device is further operable to map the estimated downlink radio condition to one of a plurality of uplink Radio Coverage Category (RCC) values.

9. A method in a wireless device configured to communicate with a Radio Access Network (RAN) node and a Core Network (CN) node, the method comprising:
receiving, from the RAN node, control channels;
estimating a downlink radio condition based on a signal quality of the received control channels;
mapping the estimated downlink radio condition to one of a plurality of downlink Radio Coverage Category (RCC) values;
transmitting, to the RAN node, one or more access burst (AB) based first messages per an uplink RCC value, wherein each of the one or more AB based first messages includes the one downlink RCC value;
determining that a first AB based system access failed after transmitting the one or more AB based first messages; and
upon the determination that the first AB based system access failed:
incrementing the one downlink RCC value, the uplink RCC value, or both the one downlink RCC value and the uplink RCC value; and
transmitting, to the RAN node, one or more access burst (AB) based second messages per the uplink RCC value, if not incremented, or the incremented uplink RCC value, if incremented, wherein each of the one or more AB based second messages includes the one downlink RCC value, if not incremented, or the incremented one downlink RCC value, if incremented.

10. The method of claim 9, further comprising:
determining that a second AB based system access failed after transmitting the one or more AB based second messages; and
upon the determination that the second AB based system access failed:
re-incrementing/incrementing the one downlink RCC value, the incremented one downlink RCC value, the uplink RCC value, the incremented uplink RCC value, or both of the following: (1) the one downlink RCC value or the incremented one downlink RCC value, and (2) the uplink RCC value or the incremented uplink RCC value; and transmitting, to the RAN node, one or more access burst (AB) based third messages per the uplink RCC value after the re-incrementing/incrementing step, wherein each of the one or more AB based third messages includes the downlink RCC value after the re-incrementing/incrementing step; or triggering a cell re-selection procedure.

11. The method of claim 9, further comprising:
determining that a second AB based system access succeeded after transmitting the one or more AB based second messages; and
upon determining that the second AB based system access succeeded, use Normal Burst (NB) based messages in subsequent system access attempts.

12. The method of claim 11, further comprising:
receiving, from the RAN node, a first message having a number of repeated downlink transmissions based on (1) the one downlink RCC value when the first AB based system access succeeded, or (2) either the one downlink RCC, if not incremented, or the incremented one downlink RCC value when the second AB based system access succeeded.

13. The method of claim 12, wherein:
the first message includes another uplink RCC value, and the method further comprises:
mapping the another uplink RCC value to a number of repeated uplink transmissions; and
transmitting, to the RAN node, one or more second messages repeated according to the number of repeated uplink transmissions.

14. The method of claim 13, wherein the first message further includes a new downlink RCC value.

15. The method of claim 9, further comprising:
transmitting, to the CN node, an updated downlink RCC value in a cell update, wherein the updated downlink RCC value is estimated at a predetermined time prior to a next occurrence of a paging group.

16. The method of claim 9, wherein the mapping step further comprises mapping the estimated downlink radio condition to one of a plurality of uplink Radio Coverage Category (RCC) values.

17. A wireless device configured to communicate with a Radio Access Network (RAN) node, the wireless device comprising:
a processor; and,
a memory that stores processor-executable instructions, wherein the processor interfaces with the memory to execute the processor-executable instructions, whereby the wireless device is operable to:
receive, from the RAN node, control channels;
estimate a downlink radio condition based on a signal quality of the received control channels;
map the estimated downlink radio condition to one of a plurality of downlink Radio Coverage Category (RCC) values;
determine whether the received control channels indicate a first cell size or a second cell size, where the first cell size is smaller than the second cell size;
based on the determination that the received control channels indicate the first cell size, transmit, to the RAN node, one or more normal burst (NB) based first messages, wherein each of the one or more NB based first messages includes the one downlink RCC value; and
based on the determination that the received control channels indicate the second cell size, transmit, to the RAN node, one or more access burst (AB) based first messages, wherein each of the one or more AB based first messages includes the one downlink RCC value.

18. The wireless device of claim 17, wherein the wireless device is further operable to:
determine that a NB based system access failed after transmitting the one or more NB based first messages; and
upon the determination that the NB based system access failed, perform an AB based system access.

19. The wireless device of claim 17, wherein the wireless device is further operable to:
upon successfully performing the AB based system access after transmitting the one or more AB based first messages, (1) retain knowledge of Timing Advance (TA) information and (2) subsequently perform a NB based system access utilizing the TA information.

20. The wireless device of claim 17, wherein the wireless device is further operable to map the estimated downlink radio condition to one of a plurality of uplink Radio Coverage Category (RCC) values.

21. A method in a wireless device configured to communicate with a Radio Access Network (RAN) node, the method comprising:
receiving, from the RAN node, control channels;
estimating a downlink radio condition based on a signal quality of the received control channels;
mapping the estimated downlink radio condition to one of a plurality of downlink Radio Coverage Category (RCC) values;
determining whether the received control channels indicate a first cell size or a second cell size, where the first cell size is smaller than the second cell size;
based on the determination that the received control channels indicate the first cell size, transmitting, to the RAN node, one or more normal burst (NB) based first messages, wherein each of the one or more NB based first messages includes the one downlink RCC value; and
based on the determination that the received control channels indicate the second cell size, transmitting, to the RAN node, one or more access burst (AB) based first messages, wherein each of the one or more AB based first messages includes the one downlink RCC value.

22. The method of claim 21, further comprising:
determining that a NB based system access failed after transmitting the one or more NB based first messages; and
upon determining that the NB based system access failed, performing an AB based system access.

23. The method of claim 21, further comprising:
upon successfully performing the AB based system access after transmitting the one or more AB based first messages, (1) retaining knowledge of Timing Advance (TA) information and (2) subsequently performing a NB based system access utilizing the TA information.

24. The method of claim 21, wherein the mapping step further comprises mapping the estimated downlink radio condition to one of a plurality of uplink Radio Coverage Category (RCC) values.

25. A wireless device configured to communicate with a Radio Access Network (RAN) node, the wireless device comprising:

a processor; and, a memory that stores processor-executable instructions, wherein the processor interfaces with the memory to execute the processor-executable instructions, whereby the wireless device is operable to:

receive, from the RAN node, a synchronization channel (SCH);

determine a number of blind transmissions needed to decode the SCH;

map the determined number of blind transmissions needed to decode the SCH to an uplink Radio Coverage Category (RCC) value and a downlink RCC value; and, transmit, to the RAN node, a first message having a number of repeated transmissions based on the uplink RCC value, wherein the first message also includes the downlink RCC value.

26. A method in a wireless device configured to communicate with a Radio Access Network (RAN) node, the method comprising:

receiving, from the RAN node, a synchronization channel (SCH);

determining a number of blind transmissions needed to decode the SCH;

mapping the determined number of blind transmissions needed to decode the SCH to an uplink Radio Coverage Category (RCC) value and a downlink RCC value; and, transmitting, to the RAN node, a first message having a number of repeated transmissions based on the uplink RCC value, wherein the first message also includes the downlink RCC value.

* * * * *